US010316246B2

(12) United States Patent
Li et al.

(10) Patent No.: US 10,316,246 B2
(45) Date of Patent: Jun. 11, 2019

(54) PHOTOLUMINESCENT NANOPARTICLES AND THEIR SYNTHESIS AND USES

(71) Applicant: The Hong Kong Polytechnic University, Hong Kong (CN)

(72) Inventors: Pei Li, Hong Kong (CN); Yuan Yao, Hong Kong (CN); Dechao Niu, Shanghai (CN)

(73) Assignee: The Hong Kong Polytechnic University (CN)

( * ) Notice: Subject to any disclaimer, the term of this patent is extended or adjusted under 35 U.S.C. 154(b) by 55 days.

(21) Appl. No.: 15/610,071

(22) Filed: May 31, 2017

(65) Prior Publication Data

US 2017/0342319 A1 Nov. 30, 2017

Related U.S. Application Data

(60) Provisional application No. 62/343,214, filed on May 31, 2016.

(51) Int. Cl.
| | |
|---|---|
| *C09K 11/06* | (2006.01) |
| *C08F 220/06* | (2006.01) |
| *C08F 283/00* | (2006.01) |
| *C08K 11/00* | (2006.01) |

(52) U.S. Cl.
CPC ............ *C09K 11/06* (2013.01); *C08F 283/00* (2013.01); *C08F 283/002* (2013.01); *C09K 2211/14* (2013.01)

(58) Field of Classification Search
None
See application file for complete search history.

(56) References Cited

U.S. PATENT DOCUMENTS

2013/0030119 A1* 1/2013 Wang .................. C08B 37/0021
525/54.3

OTHER PUBLICATIONS

Shyamal, M., et al., Pyrene Scaffold as Real-Time Fluorescent Turn-on Chemosensor for Selective Detection of Trace-Level Al(III) and Its Aggregation-Induced Emission Enhancement. The Journal of Physical Chemistry A, 2016. 120(2): p. 210-220.
Shi, B., et al., Nitrogen-rich functional groups carbon nanoparticles based fluorescent pH sensor with broad-range responding for environmental and live cells applications. Biosensors and Bioelectronics, 2016. 82: p. 233-239.
Takashima, I., et al., Development of an AND Logic-Gate-Type Fluorescent Probe for Ratiometric Imaging of Autolysosome in Cell Autophagy. Chemistry—A European Journal, 2015. 21(5): p. 2038-2044.
Chang, S., et al., A pH-responsive hybrid fluorescent nanoprober for real time cell labeling and endocytosis tracking. Biomaterials, 2013. 34(38): p. 10182-10190.
Chang, S., et al., A Hydrophobic Dye-Encapsulated Nano-Hybrid as an Efficient Fluorescent Probe for Living Cell Imaging. Advanced Healthcare Materials, 2012. 1(4): p. 475-479.
Peng, H.-S. and D.T. Chiu, Soft fluorescent nanomaterials for biological and biomedical imaging. Chemical Society Reviews, 2015. 44(14): p. 4699-4722.
Baldo, M.A., et al., Highly efficient phosphorescent emission from organic electroluminescent devices. Nature, 1998. 395(6698): p. 151-154.
Dias, F.B., et al., Triplet Harvesting with 100% Efficiency by Way of Thermally Activated Delayed Fluorescence in Charge Transfer OLED Emitters. Advanced Materials, 2013. 25(27): p. 3707-3714.
Zhou, G., et al., Triphenylamine-Dendronized Pure Red Iridium Phosphors with Superior OLED Efficiency/Color Purity Trade-Offs. Angewandte Chemie International Edition, 2007. 46(7): p. 1149-1151.
O'Regan, B. and M. Gratzel, A low-cost, high-efficiency solar cell based on dye-sensitized colloidal TiO2 films. Nature, 1991. 353(6346): p. 737-740.
Wang, P., et al., A stable quasi-solid-state dye-sensitized solar cell with an amphiphilic ruthenium sensitizer and polymer gel electrolyte. Nat Mater, 2003. 2(6): p. 402-407.
Law, M., et al., Nanowire dye-sensitized solar cells. Nat Mater, 2005. 4(6): p. 455-459.
You, J., et al., A polymer tandem solar cell with 10.6% power conversion efficiency. Nat Commun, 2013. 4: p. 1446.
Yang, Y., et al., High-performance multiple-donor bulk heterojunction solar cells. Nat Photon, 2015. 9(3): p. 190-198.
Michalet, X., et al., Quantum Dots for Live Cells, in Vivo Imaging, and Diagnostics. Science, 2005. 307(5709): p. 538-544.
Deng, R., et al., Temporal full-colour tuning through non-steady-state upconversion. Nat Nano, 2015. 10(3): p. 237-242.
Zhou, B., et al., Controlling upconversion nanocrystals for emerging applications. Nat Nano, 2015. 10(11): p. 924-936.
Wu, C. and D.T. Chiu, Highly Fluorescent Semiconducting Polymer Dots for Biology and Medicine. Angewandte Chemie International Edition, 2013. 52(11): p. 3086-3109.
Chen, S. et al. Fabrication of fluorescent nanoparticles based on AIE luminogens (AIE dots) and their applications in bioimaging. Materials Horizons, 2016. 3(4): p. 283-293.
Zhu, S., et al., The photoluminescence mechanism in carbon dots (graphene quantum dots, carbon nanodots, and polymer dots): current state and future perspective. Nano Research, 2015. 8(2): p. 355-381.
Kozák, O., et al., Photoluminescent Carbon Nanostructures. Chemistry of Materials, 2016. 28(12): p. 4085-4128.

(Continued)

*Primary Examiner* — Ana L. Woodward
(74) *Attorney, Agent, or Firm* — Law Offices of Albert Wai-Kit Chan, PLLC

(57) ABSTRACT

The present invention discloses a method of preparing polymeric photoluminescent dots in water using inexpensive non-conjugated polymers. The resulting polymeric photoluminescent dots display the following properties: excellent water dispersibility, low toxicity, high absorptivity, good photo-stability and high quantum yield. The photoluminescent properties are not influenced by aggregation-caused quenching effect. The method is amenable to scale-up and is environmentally friendly.

19 Claims, 15 Drawing Sheets

(56) References Cited

OTHER PUBLICATIONS

Zhao, E., et al., Poly[(maleic anhydride)-alt-(vinyl acetate)]: A Pure Oxygenic Nonconjugated Macromolecule with Strong Light Emission and Solvatochromic Effect. Macromolecules, 2015. 48(1): p. 64-71.

Zhou, Q., et al., Clustering-Triggered Emission of Nonconjugated Polyacrylonitrile. Small, 2016: p. n/a-n/a.

Pastor-Pérez, L., et al., Unprecedented Blue Intrinsic Photoluminescence from Hyperbranched and Linear Polyethylenimines: Polymer Architectures and pH-Effects. Macromolecular Rapid Communications, 2007. 28(13): p. 1404-1409.

Zhu, S., et al., The crosslink enhanced emission (CEE) in non-conjugated polymer dots: from the photoluminescence mechanism to the cellular uptake mechanism and internalization. Chemical Communications, 2014. 50(89): p. 13845-13848.

Sun, B., et al., Fluorescent non-conjugated polymer dots for targeted cell imaging. Nanoscale, 2016. 8(18): p. 9837-9841.

Sun, Y., et al., Ultrabright and Multicolorful Fluorescence of Amphiphilic Polyethyleneimine Polymer Dots for Efficiently Combined Imaging and Therapy. Scientific Reports, 2013. 3: p. 3036.

Liu, S.G., et al., Water-Soluble Nonconjugated Polymer Nanoparticles with Strong Fluorescence Emission for Selective and Sensitive Detection of Nitro-Explosive Picric Acid in Aqueous Medium. ACS Applied Materials & Interfaces, 2016. 8(33): p. 21700-21709.

Liu, S.G., et al., Polyethylenimine-Derived Fluorescent Nonconjugated Polymer Dots with Reversible Dual-Signal pH Response and Logic Gate Operation. The Journal of Physical Chemistry C, 2017. 121(12): p. 6874-6883.

Hola, K., et al., Carbon dots—Emerging light emitters for bioimaging, cancer therapy and optoelectronics. Nano Today, 2014. 9(5): p. 590-603.

Cheng, Y.-J., S.-H. Yang, and C.-S. Hsu, Synthesis of Conjugated Polymers for Organic Solar Cell Applications. Chemical Reviews, 2009. 109(11): p. 5868-5923.

Huang, X., et al., Enhancing solar cell efficiency: the search for luminescent materials as spectral converters. Chemical Society Reviews, 2013. 42(1): p. 173-201.

* cited by examiner

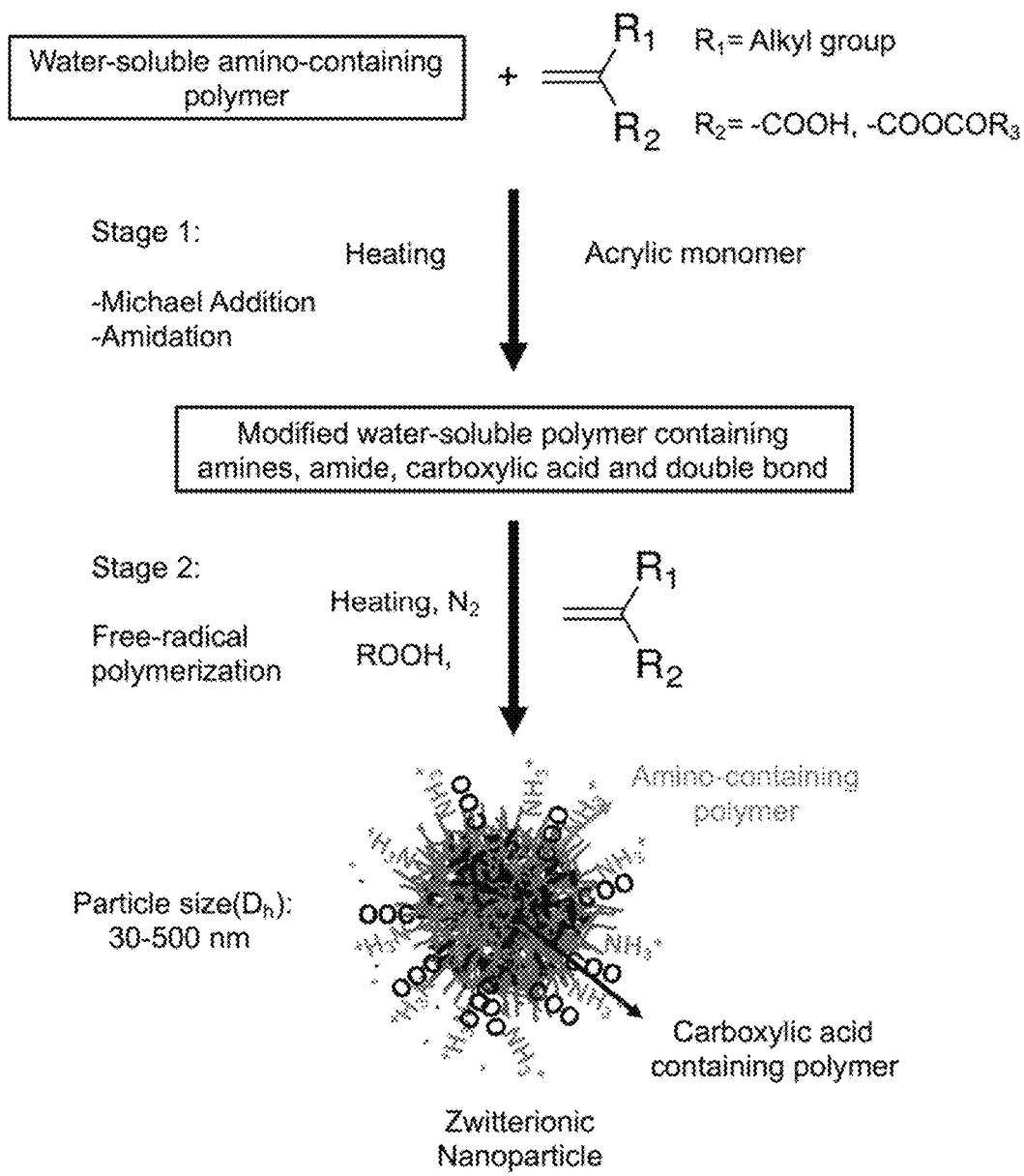

Colorless    Colorless    Pale yellow    Yellow    Orange yellow

Light blue    Blue    Blue    Green-blue    Yellow

PHOTOLUMINESCENT NANOPARTICLES AND THEIR SYNTHESIS AND USES

CROSS-REFERENCE TO RELATED APPLICATIONS

This application claims the benefit of U.S. Provisional Application No. 62/343,214, filed May 31, 2016. The entire contents and disclosures of the preceding application are incorporated by reference into this application.

Throughout this application, various publications are cited. The disclosures of these publications in their entireties are hereby incorporated by reference into this application to more fully describe the state of the art to which this invention pertains.

FIELD OF THE INVENTION

The present invention relates to water-based photoluminescent polymer dots.

BACKGROUND OF THE INVENTION

There is an enormous demand for fluorescent materials nowadays because of their photoluminescence properties which find potential applications in diverse fields, such as chemosensing [1], environmental monitoring [2], biological analysis [3], bioimaging [4-6], organic light emission diodes (OLED) [7-9], and solar cells [10-14]. In the past decade, increasing efforts have been devoted to the development of heavy-metal-free and low-toxicity photoluminescence (PL) nanoparticles in order to overcome the drawbacks of conventional organic dyes (e.g. low water solubility, weak emission in water, and poor photostability) as well as the intrinsic toxicity of inorganic nanoparticles (e.g. quantum dots, named Q-dots) [15,16] and upconversion particles doped with rare earth metals [17]). Various types of organic-based PL nanoparticles have been developed, including semiconducting polymer nanoparticles (P-dots) that consist of π-conjugated polymer [18], organic aggregation-induced emission (AIE) dots assembled from small phenyl containing organic molecules having propellers or pinwheel shapes [19], and photoluminescent carbon nanostructures [20, 21]. Recently, a new class of organic luminescent materials derived from non-conjugated macromolecules has been scarcely reported. For examples, a pure oxygenic non-conjugated macromolecule of poly[(maleic anhydride)-alt-(vinyl acetate)] has been reported to display strong light emission in organic solvents such as THF, NMP, DMSO and DMF [22]. A non-conjugated polyacrylonitrile (PAN) which is almost non-luminescent in dilute solutions becomes highly emissive when concentrated or aggregated as nanosuspensions, solid powders and films [23]. In contrast to conventional fluorescent molecules which suffer from aggregation-caused quenching, the PL property of the non-conjugated polymer is attributed to the aggregation-enhanced emission mechanism such as clustering-triggered emission.

Branched polyethyleneimine (PEI) is a water-soluble polymer that consists of 25% primary, 50% secondary and 25% tertiary amines. This amine-rich PEI (25 kD) has been found to display very weak blue emissions (fluorescence quantum yield $\Phi_f$~0.01) in water [24].

Two approaches have been reported to enhance the optical properties of the PEI.

Firstly, crosslinking low molecular weight and branched PEI to form PEI-based nanoparticles. Yang's group recently reported PEI-based photoluminescence dots through crosslinking low molecular weight and branched PEI (Mw=1800) with a carbon tetrachloride (CTC) [25]. The resulting crosslinked PEI particles possess a broad size distribution with an average hydrodynamic diameter of ca. 180 nm measured by dynamic light scattering (DLS). The enhanced PL intensity of the crosslinked PEI may be attributed to the decreased in vibration and rotation of amino-based chromophores, leading to a crosslinking enhanced emission (CEE) effect. They have also demonstrated that this type of water-dispersible PEI-based photoluminescent dots is able to achieve targeted cell imaging [26]. However, this method usually generates particles with a broad size distribution because the crosslinking reaction is difficult to control. Furthermore, the maximum quantum yield of the crosslinked PEI nanoparticles is less than 10%.

Secondly, self-assembly of hydrophobically modified PEI into nanoparticles has been disclosed. Sun et al reported ultra-bright and multicolor PEI-based polymer dots which were fabricated via first conjugation of hydrophobic polylactide (PLA) to PEI (25 kD), followed by generation of the PEI-PLA dots using an emulsion/solvent evaporation technique [27]. A weight ratio of D, L-lactide/PEI of 60 was found to give the copolymer an optimal balance between hydrophobic and hydrophilic segments. The fluorescence quantum yield of the resultant nanoparticles (ca. 227 nm in diameter) was up to 31%, which is 30 times higher than the native PEI in water. Moreover, the emission spectra of the PEI-PLA dots were generally broad and sensitive to the excitation wavelengths (multi-color fluorescence).

Luo et al reported the formation of PEI-based fluorescent nanoparticles through the Schiff base reaction between amines in PEI and formyl group in D-glucose, and then self-assembly of D-glucose conjugated PEI in aqueous solution. The resultant nanoparticles had an average hydrodynamic diameter of ca. 342 nm with surface charge around 11.2 mV. The PEI-based dots exhibit excitation independent emission property. The emission wavelength is centered at 465 nm, and the quantum yield of the nanoparticle is reported as high as 46% using quinine sulfate as a reference [28-29]. However, this approach involves tedious multiple step syntheses of hydrophobically modified PEI copolymer and subsequent self-assembly process through emulsion/solvent evaporation technique. Furthermore, the particle stability is strongly affected by acid because of easy hydrolysis of the imine or ester linkage. Finally, the self-assembly process is not amendable for a scale-up production.

SUMMARY OF THE INVENTION

The present invention discloses a novel method of preparing polymeric photoluminescent dots in water based on inexpensive non-conjugated polymeric molecules. The method involves chemical modification of amine containing water-soluble polymer with hydrophilic vinylic molecules containing carboxylic acid group, followed by the free-radical polymerization to form poly(amine-acid)-based nanoparticles.

The present invention discloses a photoluminescent poly(amine-acid) nanoparticle obtainable by a method comprising the following steps: (a) mixing an amine-containing polymer with an α,β-unsaturated carboxylic acid or carboxylic acid anhydride monomer, wherein the polymer and monomer undergo Michael addition reaction and amidation reaction to form a prepolymer; (b) adding a radical initiator to the solution resulting from step (a) to form a poly(amine-acid) polymer; and (c) allowing the poly(amine-acid) polymer to self-assemble via electrostatic interaction between carboxylic group and amine group to form the poly(amine-acid) nanoparticle.

The present invention further discloses a method for preparing a poly(amine-acid) nanoparticle, comprising the steps of: (a) reacting an amine-containing polymer and an α,β-unsaturated carboxylic acid or carboxylic acid anhydride monomer to form a prepolymer via Michael addition and amidation; and (b) adding a radical initiator to the solution resulting from step (a) to form a poly(amine-acid) polymer; and (c) allowing the poly(amine-acid) polymer to self-assemble via electrostatic interaction between carboxylic group and amine group to form the poly(amine-acid) nanoparticle.

The present invention relates to a method for detecting the presence or absence of formaldehyde or formaldehyde releasing agent in a sample.

The present invention also relates to a method for detecting the presence or absence of one or more metal ion in a sample.

BRIEF DESCRIPTION OF THE FIGURES

FIG. 1 shows a synthetic route of water-based non-conjugated photoluminescent polymer nanoparticles.

DETAILED DESCRIPTION OF THE INVENTION

Figure 2A:
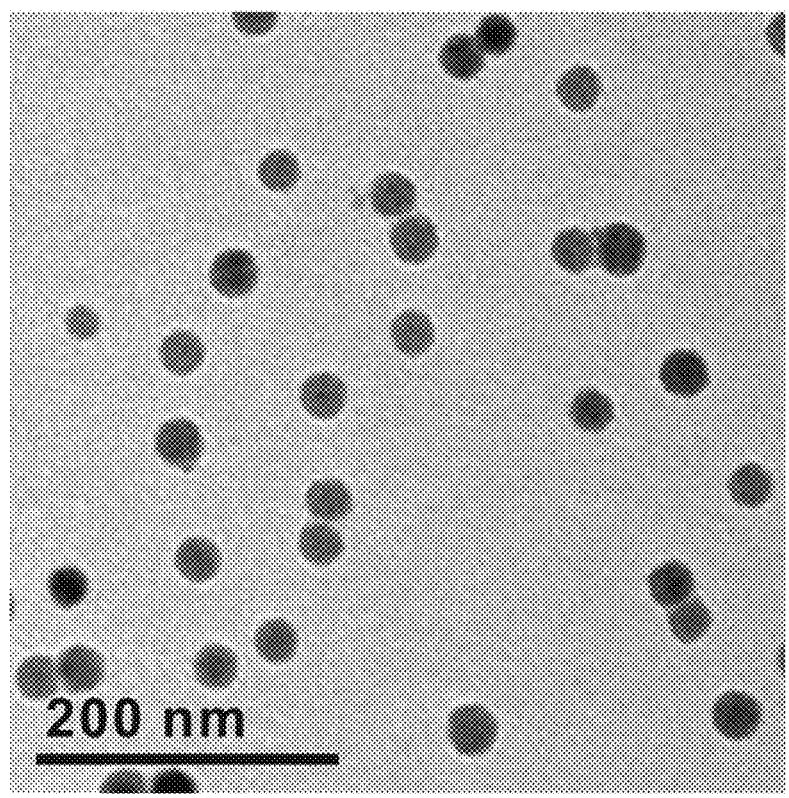
FIG. 2A shows a TEM image of PEI-PMAA nanoparticles with 0.5% PTA staining.

The present invention relates to poly(amine-acid) nanoparticles with photoluminescence properties. Disclosed is a novel method of preparing poly(amine-acid) nanoparticle dots in water using inexpensive non-conjugated polymer molecules. The method involves chemical modifications of nitrogen-containing water-soluble polymers with hydrophilic vinylic molecules containing carboxylic acid or carboxylic acid anhydride groups, followed by free-radical polymerization to form poly(amine-acid)-based nanoparticles.

In one embodiment, a prepolymer is prepared by the chemical modification of an amine-containing water-soluble polymer through (a) a Michael addition reaction between the amine of the amine-containing polymer and the double bond of an acrylic acid-based monomer; and (b) an amidation reaction between the amine of the amine-containing polymer and the carboxyl group of the acrylic acid-based monomer (FIG. 1). Then, the prepolymer is polymerized in the presence of a radical initiator such as peroxide to afford poly(amine-acid) nanoparticles. The resultant poly(amine-acid) nanoparticles are well dispersed in water with narrow particle size distribution. The hydrodynamic diameters of the nanoparticles can vary in the range of 30 nm to 500 nm through controlling the amount of acrylic monomer used. The acrylic monomer conversions are usually greater than 95%. The nanoparticles can emit strong fluorescent light upon radiation with quantum yield reaching up to 85%. The enhanced photoluminescence properties of the poly(amine-acid) nanoparticles can be attributed to the synergistic effects of decreased vibration and rotation of amino-based chromophore, clustering of carbonyl chromophore, and nano-sized polymer aggregates with the quantum confinement effect. These effects lead to an efficient electron overlap between lone pairs and π electrons through polar-polar and n-π interaction [23].

In one embodiment, the nitrogen-containing polymer is hydrophilic. In another embodiment, the nitrogen-containing polymer can be natural or synthetic. The nitrogen-containing polymer consists of one or more amine group selected from the group consisting of primary amine (—NH$_2$), secondary amine (—NRH) and tertiary amine Structurally, the nitrogen-containing polymer can be in the form of linear of cyclic aliphatic or aromatic amine. The amine functional groups can be located in the polymer main chain or in the side chains.

In general, biopolymers of natural and synthetic nitrogen-containing polymer give high conversion of the acrylic monomer and form very stable poly(amine-acid) nanoparticles with narrow size distribution.

In one embodiment, the nitrogen-containing polymer is a synthetic polymer selected from the group consisting of polyethyleneimine (PEI). In some embodiments, the natural nitrogen-containing polymer is selected from the group consisting of N-acetyl sugars such as chitosan, and proteins such as casein, gelatin and bovine serum albumin.

The prepolymer can be prepared using an acrylic acid-based monomer.

In one embodiment, the acrylic monomer has the formula $CH_2=CR_1R_2$, wherein $R_1$ is hydrogen, alkyl having 1-10 carbon atoms, preferably alkyl having 1-3 carbon atoms, phenyl, or optionally substituted phenyl, and $R_2$ is —COOH or —COOCOR$_3$, wherein $R_3$ is alkyl, phenyl, optionally substituted phenyl, benzyl, optionally substituted benzyl, heteroaryl or optionally substituted heteroaryl.

In one embodiment, the acrylic monomer is an α,β-unsaturated carboxylic acid anhydride in either linear or cyclic form.

When forming nanoparticles using an acrylic monomer, the nitrogen-containing polymer is preferably dissolved in an aqueous system, such as water, acid or other appropriate system chosen to suit the polymer. The weight ratio of monomer to nitrogen-containing polymer is usually in the range of 1:10 to 10:1, and preferably 2:1 to 6:1.

The mole ratio of acrylic monomer to radical initiator is preferably more than 1000:1 and preferably 5000:1. In some embodiments, the radical initiator is selected from the group consisting of hydroperoxide, potassium persulfate, 2,2'-azo-bis(2-amidinopropane) hydrochloride, and water-soluble azo initiators.

In one embodiment, depending on the nature of the hydrophilic polymer and monomer, the reaction can proceed at ambient temperature. In some embodiments, the temperature can be elevated to 40 to 95° C., and preferably 60 to 85° C.

For the formation of prepolymer, the reaction time ranges from 1 to 48 hours under air. For the formation of poly (amine-acid) nanoparticles, the reaction time ranges from 0.5 to 4 hours under an appropriate atmosphere such as nitrogen.

The particle size of the poly(amine-acid) nanoparticles is measured as the hydrodynamic diameter ($D_h$). Typically, the poly(amine-acid) nanoparticles have narrow size distribution. The size distribution of the poly(amine-acid) nanoparticles is measured as polydispersity index (PDI) value and is in the range of about 0.05 to 0.2.

In one embodiment, the present invention involves a method to prepare water dispersible non-conjugated photoluminescent polymer dots via chemical modification of water-soluble amine-containing polymers. An aqueous graft copolymerization between a monomer containing carboxylic acid or anhydride group and a water-soluble amine-containing polymer, biopolymer or synthetic polymer to form nanoparticles driven by electrostatic interaction between the grafted carboxylic acid-containing polymers and the water-soluble amine-containing polymer. In this process, the carboxylic acid-containing polymer provides the negative charges, which could neutralize the partial positive charges of the amine-containing polymer, resulting in the formation of hydrophilic domains of the nanoparticles.

The method of preparing the present poly(amine-acid) nanoparticles has several distinct advantages.

It is a simple and convenient method which only requires a one-pot synthesis involving chemical modification, graft copolymerization and self-assembly driven by an electrostatic interaction. The method is also suitable for large-scale production.

The highly photoluminescent nanoparticles synthesized through non-conjugated polymer and monomer do not require any traditional dye molecules. For the traditional photoluminescent molecules, fabrication into nanoparticles always suffers from the aggregation-caused-quenching (ACQ) effect. The ACQ effect will cause a lot of problems in a system of semiconducting polymer, in which the chromophores are conjugated phenyl rings. The poly(amine-acid) nanoparticles of the present invention can avoid the ACQ effect.

The raw materials needed for the present invention are all conventional materials widely available.

Structure with interpenetrating networks is formed between a negatively charged hydrophilic carboxylic acid-containing polymer and an amine-containing polymer; therefore, the resulting poly(amine-acid) nanoparticles are pH responsive in the whole pH range.

The poly(amine-acid) nanoparticles made from water soluble amine-containing polymer and acrylic acid-based monomer as the raw materials are highly soluble in aqueous systems, which can be used to prepare emulsions of high solid content.

The method of the present invention can be used to prepare a wide range of novel biomaterials and synthetic polymers with well-defined narrow size distribution.

Being environmentally friendly, the method of the present invention does not require any surfactant, and employs aqueous-based chemistry.

The nanoparticles of the present invention possess remarkable optical performance, with absolute quantum yield as high as 85%, which is comparable to commercial organic dye in the same emission wavelength (quinine sulfate, QY 54%). The nanoparticles also exhibit bright phosphorescence in solid state.

The present invention discloses a photoluminescent poly (amine-acid) nanoparticle obtainable by a method comprising the following steps: (a) mixing an amine-containing polymer with an α,β-unsaturated carboxylic acid or carboxylic acid anhydride monomer, wherein the polymer and monomer undergo Michael addition reaction and amidation reaction to form a prepolymer; (b) adding a radical initiator to the prepolymer resulting from step (a) to form a poly (amine-acid) polymer; and (c) allowing the poly(amine-acid) polymer to self-assemble via electrostatic interaction between carboxylic group and amine group to form the poly(amine-acid) nanoparticle.

In some embodiments, the monomer has the formula $CH_2=CR_1R_2$, wherein $R_1$ is hydrogen, alkyl having 1-10 carbon atoms, preferably alkyl having 1-3 carbon atoms, phenyl, or optionally substituted phenyl, and $R_2$ is —COOH or —COOCOR$_3$ wherein $R_3$ is alkyl, phenyl, optionally substituted phenyl, benzyl, optionally substituted benzyl, heteroaryl, or optionally substituted heteroaryl. In one embodiment, amine-containing polymer is synthetic or natural polymer comprising amino group. In another embodiment, the amine-containing polymer is water soluble. In one embodiment, the amine-containing polymer is selected from the group consisting of polyethyleneimine (PEI), linear Polyethylenimine, poly(allylamine), poly (acrylamide), poly[dimethylsiloxane-co-(3-aminopropyl)methylsiloxane], poly(vinyl amine), poly(N-methylvinylamine), chitosan, polylysine, casein, gelatin, bovine serum albumin and protein. In one embodiment, the amine-containing polymer has an average molecular weight of 1800 to 75000. In one embodiment, the amine-containing polymer has an average molecular weight of 10000 to 60000. In one embodiment, the amine-containing polymer has an average molecular weight of 20000 to 50000. In one embodiment, the amine-containing polymer has an average molecular weight of 25000 to 45000. In one embodiment, the amine-containing polymer has an average molecular weight of 45000 to 75000.

In one embodiment, the amine-containing polymer is polyethyleneimine (PEI) and the acrylic acid monomer is methacrylic acid.

In one embodiment, the poly(amine-acid) nanoparticle has a particle size ranging from 15 nm to 35 nm. The nanoparticle has hydrodynamic diameter ($D_h$) value ranging from 30 nm to 500 nm, 50 nm to 200 nm, 50 nm to 100 nm, 100 nm to 200 nm, 200 nm to 300 nm, or 300 nm to 500 nm. The nanoparticle has PDI value ranging from 0.05 to 0.2, or 0.05 to 0.15. The nanoparticle has surface charges ranging from 20 mV to 55 mV, or 35 mV to 55 mV. In one embodiment, the nanoparticle has IR absorption bands at 3500-2800 $cm^{-1}$, 1750-1600 $cm^{-1}$, 1560-1540 $cm^{-1}$, 1480-1450 $cm^{-1}$, 1410-1390 $cm^{-1}$ and 1200-1100 $cm^{-1}$. In another embodiment, the nanoparticle has IR absorption bands at 3500-2800 $cm^{-1}$, 1700-1600 $cm^{-1}$, 1550 $cm^{-1}$, 1460 $cm^{-1}$, 1395 $cm^{-1}$, and 1159 $cm^{-1}$. In another embodiment, the nanoparticle has average ratio of carbon to nitrogen is in the range of 2:1 to 45:1 per dry weight. In one embodiment, the nanoparticle has an elemental composition of 51-54% carbon, 8-10% hydrogen and 10-11% nitrogen per dry weight, wherein average ratio of carbon to nitrogen is in the range of 4.5:1 to 5.5:1 per dry weight.

In certain embodiments, 0.1-1.0 mg/ml of the poly(amine-acid) nanoparticle in water has photoluminescence peak ranging from 400 nm to 420 nm under excitation wavelength of 360 nm, or 3-7.5 mg/ml of said poly(amine-acid) nanoparticle in water has photoluminescence peak ranging from 450 nm to 480 nm under excitation wavelength of 420 nm, or 4.9-5.1 mg/ml of the poly(amine-acid) nanoparticle in water has photoluminescence peak ranging from 450 nm to 470 nm under excitation wavelength of 420 nm, or 9.8-10.2 mg/ml of the poly(amine-acid) nanoparticle in water has photoluminescence peak ranging from 470 nm to 490 nm under excitation wavelength of 420 nm, or 8-20 mg/ml of said poly(amine-acid) nanoparticle in water has photoluminescence peak ranging from 470 nm to 550 nm under excitation wavelength of 420 nm.

In one embodiment, the absolute quantum yield of the poly(amine-acid) nanoparticle is up to 35%. In another embodiment, the absolute quantum yield of the poly(amine-acid) nanoparticle is up to 85%.

In one embodiment, the poly(amine-acid) nanoparticle has a fluorescence lifetime ranging from 0.3-10 ns. In one embodiment, the poly(amine-acid) nanoparticle has a fluorescence lifetime ranging from 1-5 ns. In another embodiment, the fluorescence lifetime of the poly(amine-acid) nanoparticle ranges from 1.0-1.6 ns.

In one embodiment, the poly(amine-acid) nanoparticle has a phosphorescence lifetime ranging from 1-1000 μs. In one embodiment, the poly(amine-acid) nanoparticle has a phosphorescence lifetime ranging from 1-500 μs. In one embodiment, the poly(amine-acid) nanoparticle has a phosphorescence lifetime ranging from 1-200 μs. In another embodiment, the phosphorescence lifetime of the poly(amine-acid) nanoparticle ranges from 19-23 μs.

The present invention further discloses a method for preparing a poly(amine-acid) nanoparticle, comprising the steps of: (a) reacting an amine-containing polymer and an α,β-unsaturated carboxylic acid or carboxylic acid anhydride monomer to form a prepolymer via Michael addition and amidation; and (b) adding a radical initiator to the prepolymer resulting from step (a) to form a poly(amine-acid) polymer; and (c) allowing the poly(amine-acid) polymer to self-assemble via electrostatic interaction between carboxylic group and amine group to form the poly(amine-acid) nanoparticle.

In one embodiment, the weight ratio of the acrylic acid monomer to the amine-containing polymer ranges from 1:10 to 10:1. In one embodiment, the weight ratio of the acrylic acid monomer to the amine-containing polymer ranges from 1:1 to 10:1. In another embodiment, the weight ratio of the acrylic acid monomer to the amine-containing polymer ranges from 2:1 to 6:1.

In one embodiment, the reaction is performed in a solvent selected from the group consisting of water, HCl, $H_2SO_4$, $HNO_3$, acetic acid, trifluoroacetic acid (TFA) and mixture thereof.

In some embodiments, the radical initiator is selected from the group consisting of hydroperoxide, potassium persulfate, 2,2'-azobis(2-amidinopropane) hydrochloride and other water-soluble azo initiators.

In one embodiment, the mole ratio of the monomer to the radical initiator ranges from 600:1 to 6000:1. In one embodiment, the mole ratio of the monomer to the radical initiator ranges from 1000:1 to 4000:1. In one embodiment, the mole ratio of the monomer to the radical initiator ranges from 2000:1 to 4000:1. In one embodiment, there is 0.5 to 15 wt/wt % of the nitrogen-containing polymer. In another embodiment, there is 1 to 30 wt/wt % of the monomer. In one embodiment, the reaction time for the formation of prepolymer ranges from 1 hour to 48 hours under air. In another embodiment, the reaction time for the formation of prepolymer ranges from 12 hours to 48 hours under air. In one embodiment, the reaction time for the formation of poly(amine-acid) nanoparticles ranges from 0.5 hour to 4 hours under an appropriate atmosphere such as nitrogen. In another embodiment, the reaction time for the formation of poly(amine-acid) nanoparticles ranges from 1 hour to 4 hours under an appropriate atmosphere such as nitrogen.

The present invention relates to a method for detecting the presence or absence of formaldehyde or formaldehyde releasing agent in a sample, the method comprising: (a) preparing a suspension of the poly(amine-acid) nanoparticles of claim 1 in one or more solvent; (b) detecting the fluorescence in the suspension resulting from step (a); (c) allowing the sample contact with the suspension resulting from step (a) to form a mixture; (d) detecting fluorescence in the mixture resulting from step (c); and (e) comparing the fluorescence detected in step (b) and step (d), wherein a difference in detected fluorescence between the suspension and the mixture is indicative of the presence of the formaldehyde or formaldehyde releasing agent in the sample. In some embodiments, the sample is selected from the group consisting of air, fabric, paint, ink, wood, plastic, resin, metal, paper, water, glass, coating, lacquers for packaging, toys, furniture, urine, haircare product, skincare product, fabric care product, dental care product, fine fragrance product, health care product, homecare product, cosmetics product, nail polish, nail glue, eyelash glue, hair gel, beverage product, and various combinations thereof. In certain embodiments, the formaldehyde releasing agent is selected from the group consisting of quaternium-15, imidazolidinyl urea (Germall 115), diazolidinyl urea (Germall II), DMDM hydantoin (Glydant), 2-bromo-2-nitropropane-1,3-diol (Bronopol), 5-bromo-5-nitro-1,3-dioxane (Bronidox), tris (hydroxymethyl) nitromethane (Tris Nitro), hydroxymethylglycinate (Suttocide A) and polyquaterniums polyoxymethylene urea, sodium hydroxymethylgycinate, glyoxal. In one embodiment, the solvent is selected from the group consisting of water, DMSO, DMF, acetic acid, chloroform, dichloromethane, ethyl acetate, hexane, diethyl ether, THF and various combinations thereof. The present invention also relates to a method for detecting the presence or absence of one or more metal ion in a sample, the method comprising: (a) preparing a suspension of the poly(amine-acid) nanoparticles of claim 1 in one or more solvent; (b) detecting the fluorescence in the suspension resulting from step (a); (c) allowing the sample contact with the suspension resulting from step (a) to form a mixture; (d) detecting fluorescence in the mixture resulting from step (c); and (e) comparing the fluorescence detected in step (b) and step (d), wherein a difference in detected fluorescence between the suspension and the mixture is indicative of the presence of the metal ion in the sample. In one embodiment, the metal is selected from the group consisting of copper, lead, cadmium, mercury, iron, nickel, chromium, zinc. In another embodiment, the sample is selected from the group consisting of fabric, paint, ink, wood, plastic, resin, metal, paper, water, wastewater, glass, coating, lacquers for packaging, toys, furniture, haircare product, skincare product, fabric care product, dental care product, fine fragrance product, health care product, homecare product, cosmetics product, nail polish, nail glue, eyelash glue, hair gel, food, beverage product, plants, tealeaf and various combinations thereof. In some embodiments, the solvent is selected from the group consisting of water, DMSO, DMF, acetic acid, chloroform, dichloromethane, ethyl acetate, hexane, diethyl ether, THF and various combinations thereof.

The invention will be better understood by reference to the Experimental Details which follow, but those skilled in the art will readily appreciate that the specific experiments detailed are only for illustrative purpose, and are not meant to limit the scope of the invention, which is defined by the claims following thereafter.

It is to be noted that the transitional term "comprising", which is synonymous with "including", "containing" or "characterized by", is inclusive or open-ended and does not exclude additional, un-recited elements or method steps.

Example 1

1) Synthesis of PEI-PMAA Nanoparticles

Water-soluble polymers having amino functional groups, for example polyethyleneimine (PEI), polymerize with methacrylic acid (MAA) in aqueous solution via a two-stage reaction. The PEI polymer in water was concurrently modified with MAA monomer through both Michael addition and amidation reaction to form prepolymer. The prepolymer of modified PEI contains both amide, carboxylic acid and C=C double bond and forms some degree of crosslinking. In the second stage, an alkyl hydroperoxide initiator was added to initiate the graft copolymerization of MAA under nitrogen to form poly(amine-acid) nanoparticles. After the growth of the grafted PMAA chains, the electrostatic interaction between carboxylic group in PMAA and amines in PEI will draw the PMAA chains and PEI chains together to form polyplex, thus increasing the hydrophobicity of the polymer and inducing the self-assembly process to form PEI-PMAA nanoparticles.

2) Characterization of PEI-PMAA Nanoparticles

Figure 2B:
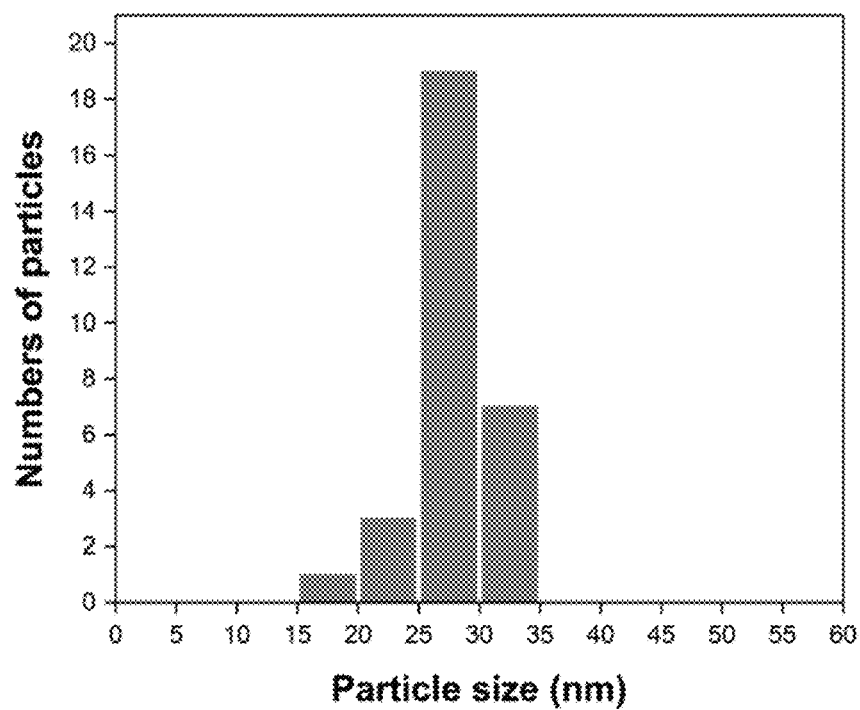
FIG. 2B shows the size distribution of PEI-PMAA nanoparticles in the TEM image of FIG. 2A.

The resulting nanoparticles possess hydrodynamic diameters in the range around 100 nm with a narrow size distribution. The PEI-PMAA nanoparticle possesses a hydrodynamic diameter ($D_h$) of 114±1.3 nm with PDI value of 0.138, and the surface charge of PEI-PMAA nanoparticles in solution is 45 mV. The morphology of PEI-PMAA nanoparticles in the dry state was evaluated by TEM. FIG. 2A shows that the PEI-PMAA nanoparticles are highly uniform with average particle size of 28 nm. FIG. 2B shows that the PEI-PMAA nanoparticles have a narrow particle size distribution from 15-35 nm.

Figure 3A:
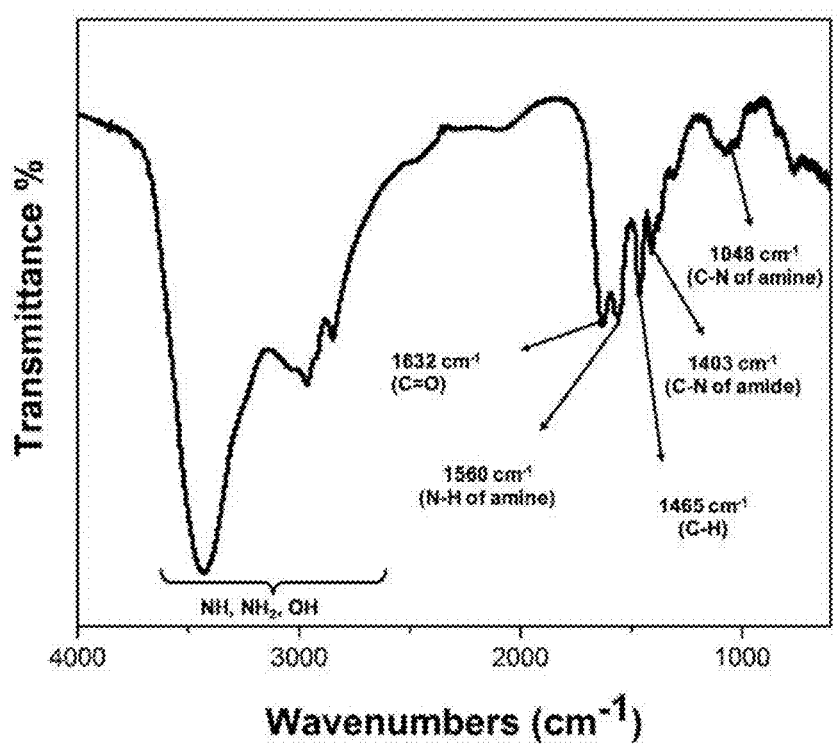
FIG. 3A shows an IR spectrum of PEI-MAA stage 1 product.
Figure 3B:
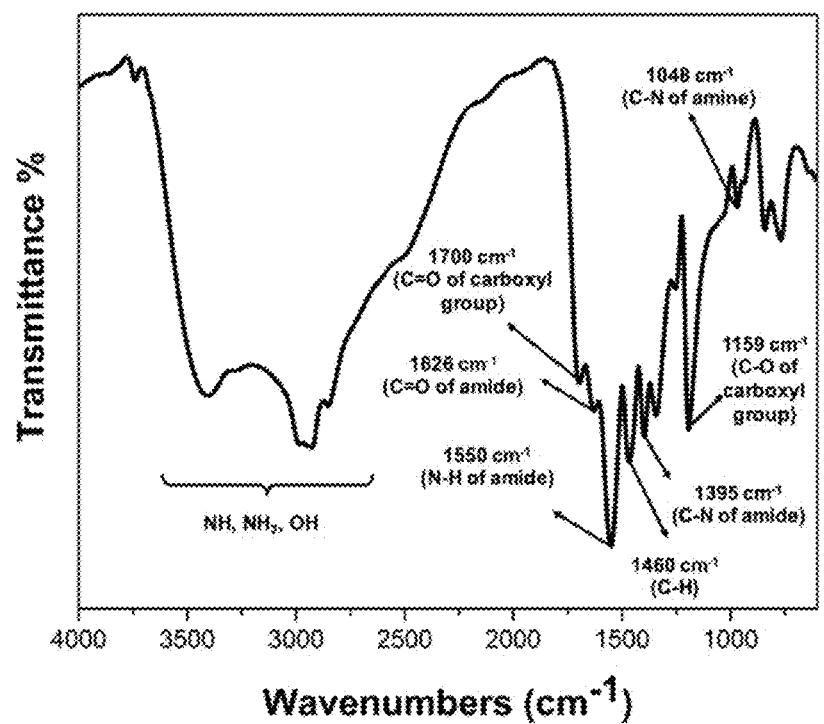
FIG. 3B shows an IR spectrum of PEI-PMAA nanoparticles (stage 2 product).

The chemical composition of PEI-PMAA was further characterized by IR, $^1$H-NMR and elemental analysis. Since there are two reaction stages, both the stage 1 (prepolymer of MAA modified PEI) and stage 2 (PEI-PMAA nanoparticles) products were characterized. FIG. 3A and FIG. 3B show the IR spectra of both stage 1 and stage 2 products, respectively. The presence of the characterization peaks of the prepolymer, MAA modified PEI and resulting PEI-PMAA nanoparticles are clearly labeled in FIGS. 3A and 3B.

Figure 4:
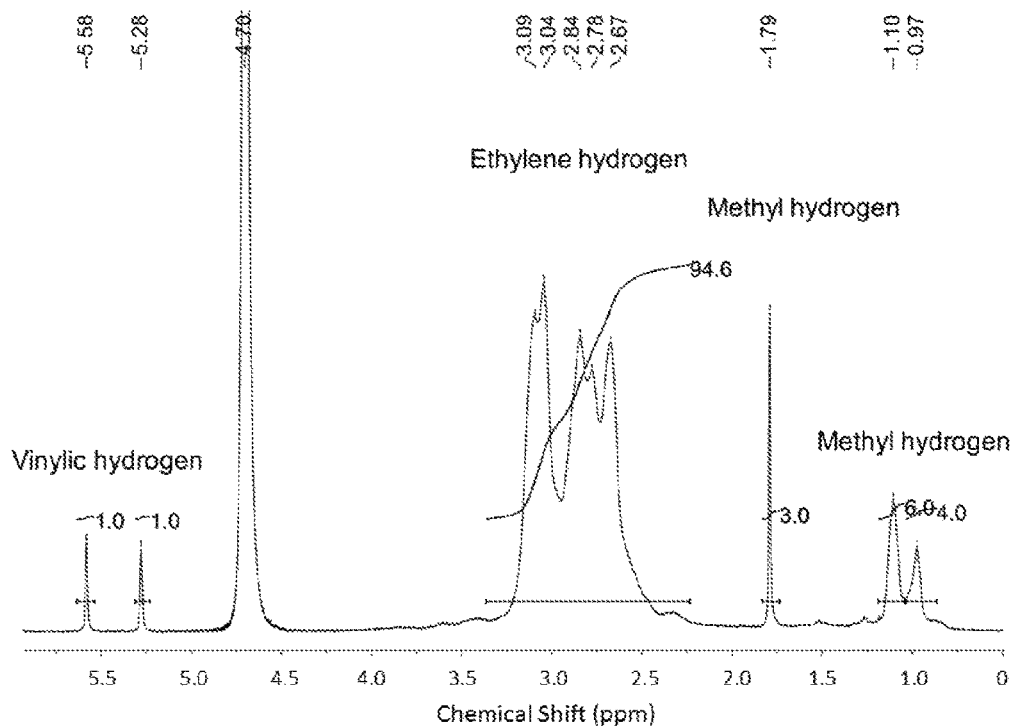
FIG. 4 shows an NMR spectrum of the PEI-MAA stage 1 product.

The $^1$H-NMR experiments were conducted in $D_2O$ to investigate the stage 1 product (prepolymer of MAA modified PEI). FIG. 4 shows the $^1$H-NMR spectrum of a stage 1 product. The peaks at 5.58 and 5.28 ppm indicate the presence of vinylic hydrogen. This result suggests that a portion of the MAA has been linked to the PEI chain through an amidation reaction. The peaks at 1.10 and 0.97 ppm are characteristic peaks of methylene group ($—CH_2CH_2—$) indicating that some MAA has been conjugated to the PEI chain via a Michael addition reaction.

Chemical compositions of the prepolymer and final nanoparticles were determined with elemental analysis (EA). Results in Table 1 show that the C/N ratio increases after polymerization, indicating the formation of graft polymer. The prepolymer comprise of 15% conjugated MAA and 85% PEI. The degree of PEI modification is 18%. The final PEI-PMAA nanoparticle comprise of 67% PMAA and 33% PEI as determined by elemental analysis results and compared to the molar ratios of PEI to PMAA.

TABLE 1

The elemental analysis results of stage 1 and stage 2 products

| Sample Name | N % | C % | H % | C/N Ratio | Average C/N Ratio |
|---|---|---|---|---|---|
| PEI-MAA prepolymer (Stage 1) | 18.13 | 41.75 | 9.512 | 2.3025 | 2.2997 |
|  | 18.89 | 43.38 | 9.687 | 2.2968 |  |
| PEI-PMAA nanoparticles (Stage 2) | 10.36 | 52.63 | 8.542 | 5.0796 | 5.1019 |
|  | 10.15 | 52.02 | 9.468 | 5.1241 |  |

3) Photoluminescence Properties of PEI-PMAA Nanoparticles

Figure 5A:
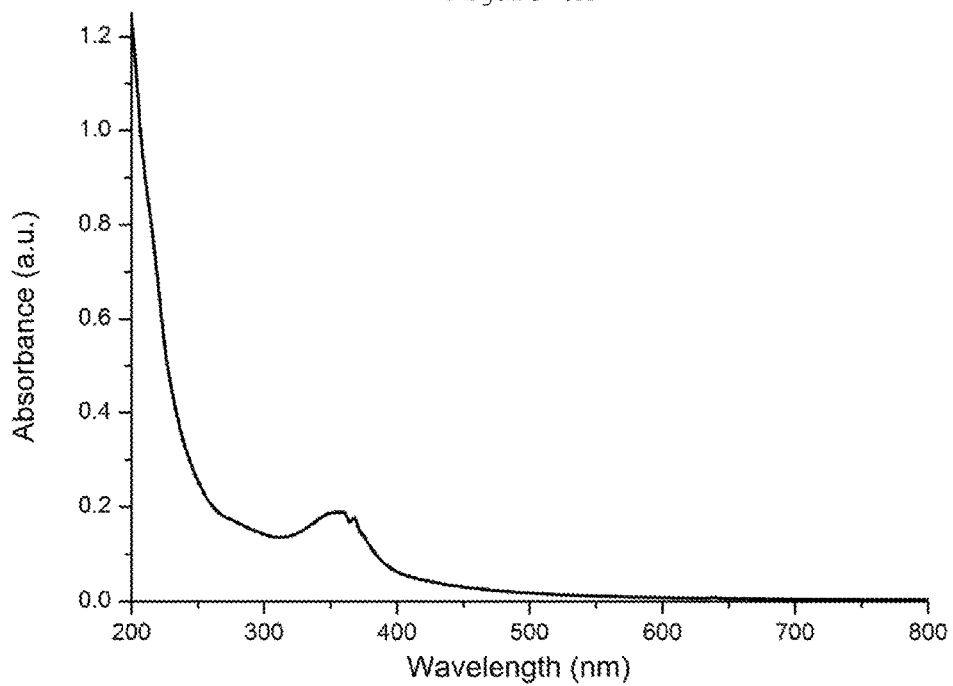
FIG. 5A shows a UV spectrum of PEI-PMAA nanoparticles in water.
Figure 5B:
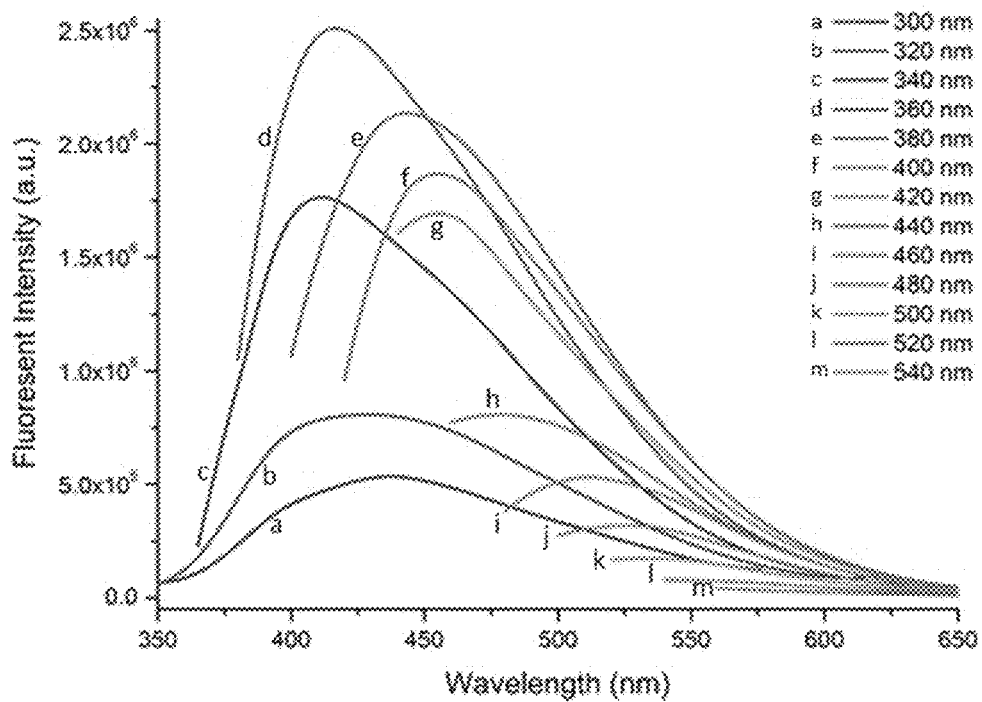
FIG. 5B shows the excitation dependent emission spectra of PEI-PMAA nanoparticles in water measured with various excitation wavelengths ranging from 300 to 540 nm.
Figure 5C:
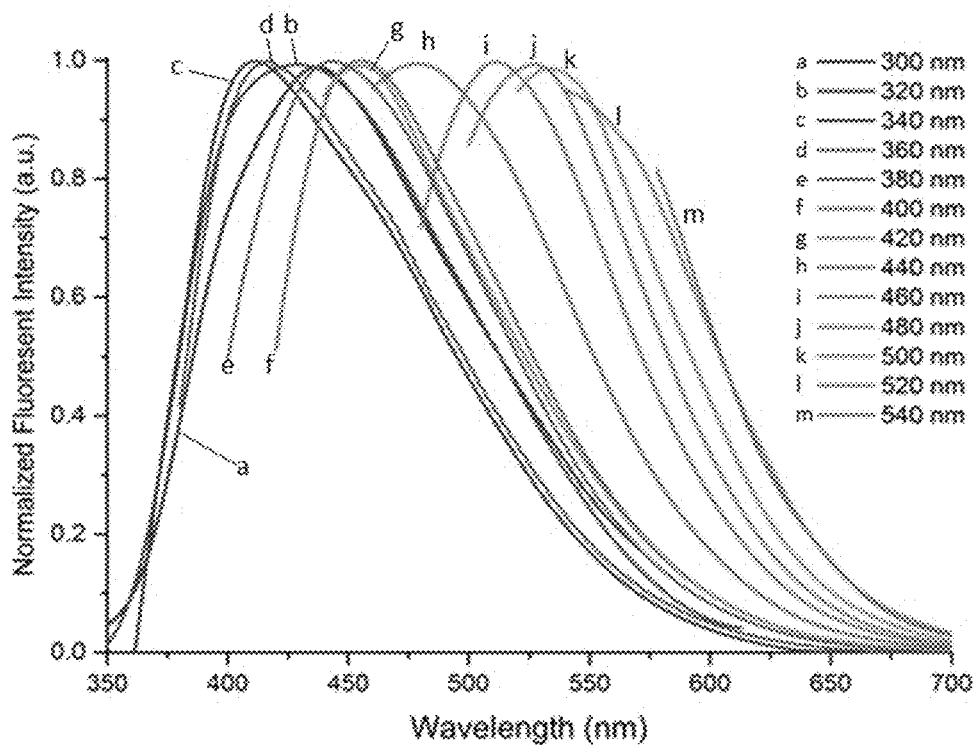
FIG. 5C shows the normalized excitation dependent emission spectra of PEI-PMAA nanoparticles in water measured with excitation wavelengths ranging from 300 to 540 nm.

The UV-Vis and photoluminescence spectra of PEI-PMAA nanoparticle were measured. FIGS. 5A, 5B and 5C show the UV and photoluminescence spectra of PEI-PMAA nanoparticle.

The PEI-PMAA nanoparticle possesses several distinguishing features: (i) Excitation dependent emission in aqueous solution; (ii) Concentration dependent emission in aqueous solution; (iii) Excellent optical performance; and (iv) Phosphorescence in solid state at room temperature.

(i) Excitation-Dependent Emission

FIG. 5B and FIG. 5C show both photoluminescence spectra and normalized photoluminescence spectra of PEI-PMAA nanoparticles. When the excitation wavelength between 300 and 360 nm, the emission wavelength is centered at 410 nm, and the emission intensity is increased with increasing the excitation wavelength. When the PEI-PMAA nanoparticles were excited with wavelength ranging from 360 to 540 nm, the emission wavelengths are red-shifted with decrease in emission intensity.

(ii) Concentration-Dependent Emission

Figure 6A:
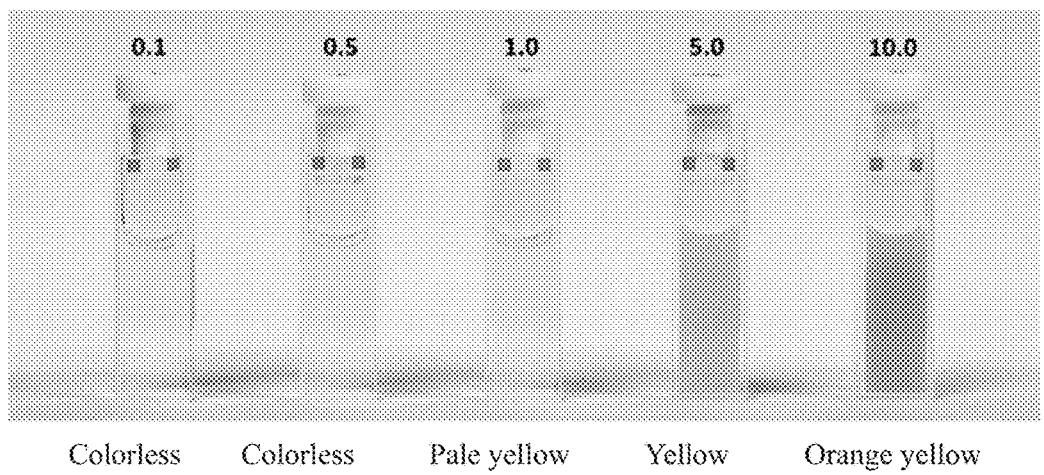
FIG. 6A shows samples of PEI-PMAA nanoparticles in different concentrations in water under room light.
Figure 6B:
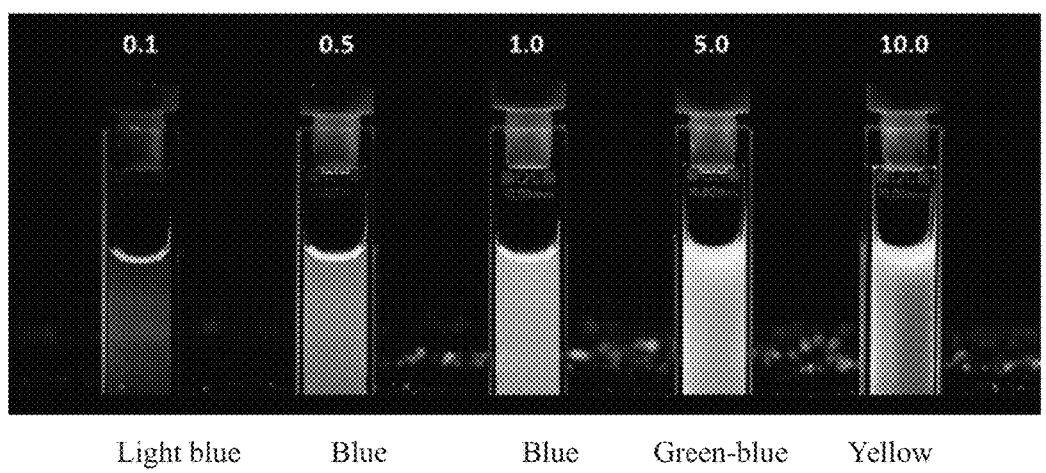
FIG. 6B shows samples of PEI-PMAA nanoparticles in different concentrations (mg/mL) in water under 365 nm irradiation.

The PEI-PMAA nanoparticles also exhibit concentration-dependent emission in water. FIGS. 6A and 6B show aqueous solutions containing different concentrations of PEI-PMAA nanoparticles with different colors under UV irradiation (365 nm): 0.1 mg/mL (light blue), 0.5 mg/mL (blue), 1 mg/mL (blue), 5 mg/mL (green-blue) and 10 mg/mL (yellow). Increasing solution concentration leads to color changes from light blue to yellow, indicating that the emission color is red-shifted with increase in the nanoparticle concentration.

Figure 7A:
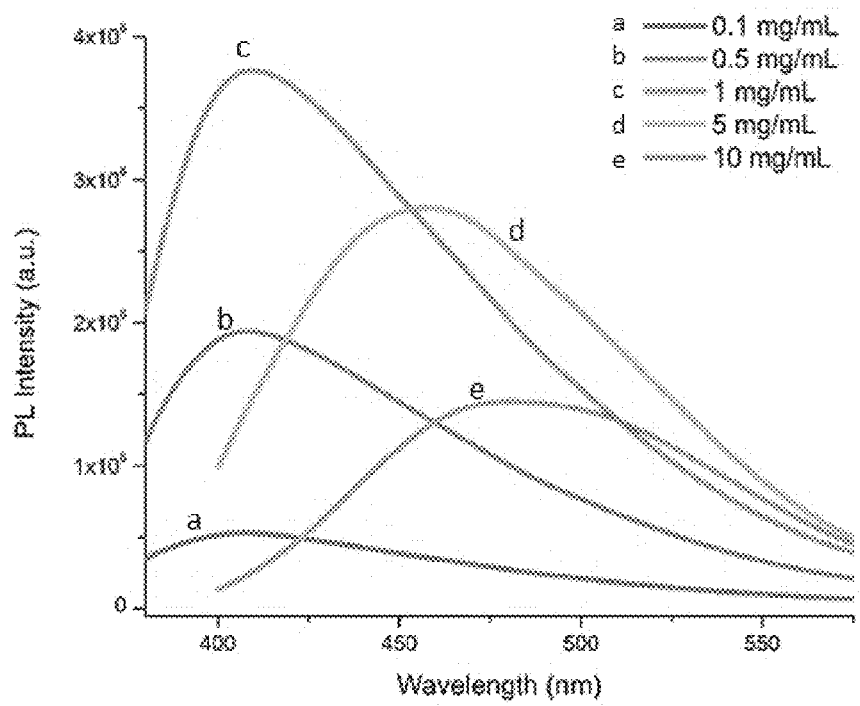
FIG. 7A shows photoluminescence spectra of PEI-PMAA nanoparticles in different concentrations in water under excitation wavelength of 360 nm.
Figure 7B:
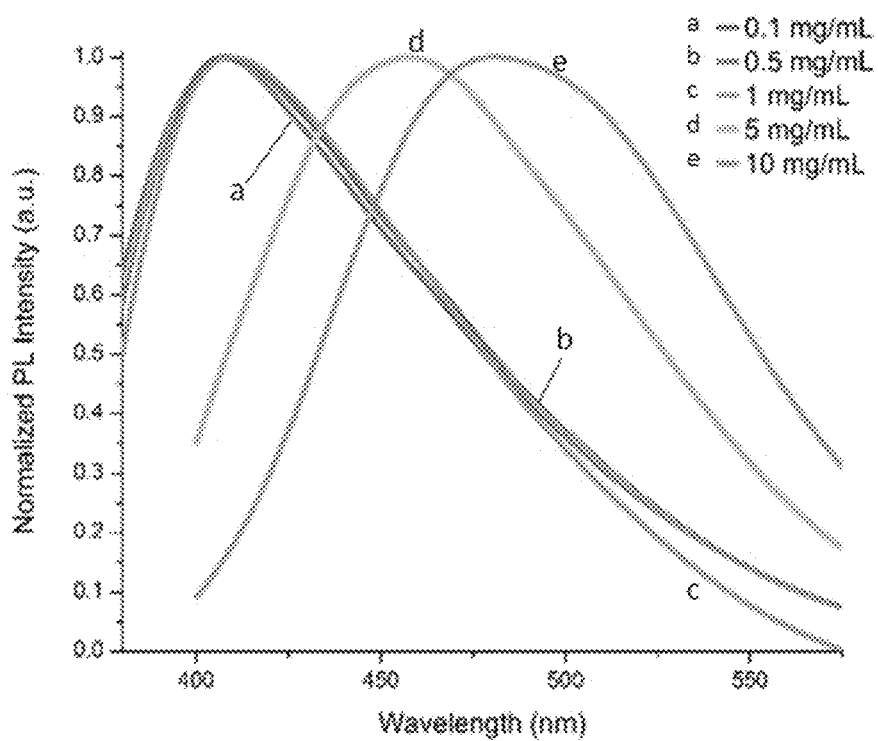
FIG. 7B shows normalized photoluminescence spectra of PEI-PMAA nanoparticles of different concentrations under excitation wavelength at 360 nm.

FIG. 7A and FIG. 7B shows the photoluminescence spectra and normalized photoluminescence spectra of PEI-PMAA nanoparticles under 360 nm excitation. The normalized photoluminescence spectra clearly indicate that increasing the nanoparticle concentration from 1, 5, to 10 mg/mL leads to red-shift of emission center from 410, 460 to 480 nm, respectively.

Figure 8:
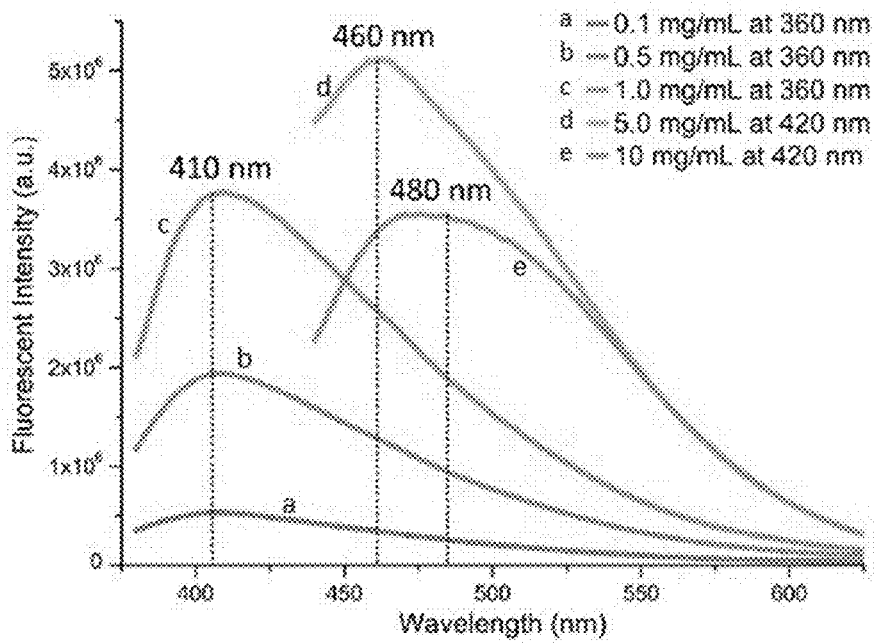
FIG. 8 shows photoluminescence spectra of PEI-PMAA nanoparticles of different concentrations in water at their optimal excitation wavelengths.

FIG. 8 shows the optimal emission wavelengths of PEI-PMAA nanoparticles with different concentrations at their optimal excitation wavelengths. The peak width of half height of PEI-PMAA nanoparticles are over 100 nm wide. For example, at concentration of 10 mg/mL, the intensity of emission at 550 nm, which is in the orange light emission window, is as high as $2 \times 10^6$ (as indicated in dotted lines in FIG. 8) Results suggest that increasing the concentration of the nanoparticle solutions did not result in fluorescence quenching. Instead, the emission wavelengths are red-shifted. This lack of quenching phenomenon is very different from the aggregation-caused-quenching (ACQ) phenomenon in the traditional conjugated organic dye molecules or the aggregation-induced-emission (AIE) phenomenon for the AIE molecules.

(iii) Excellent Optical Performance

The absolute quantum yield of the PEI-PMAA nanoparticles can reach up to 85% in aqueous solution. The fluorescent lifetime of PEI-PMAA nanoparticles is around 1.3 ns in solution.

TABLE 2

Optical properties of PEI-PMAA nanoparticles
Optical Properties

| | |
|---|---|
| Range of Emission wavelengths (Excitation-dependent emission range) | 400~600 nm |
| Absolute quantum yield | Up to 85% |
| Fluorescence lifetime | 1.3 ns |
| Phosphorescence lifetime | 21.2 μs |

Figure 9A:
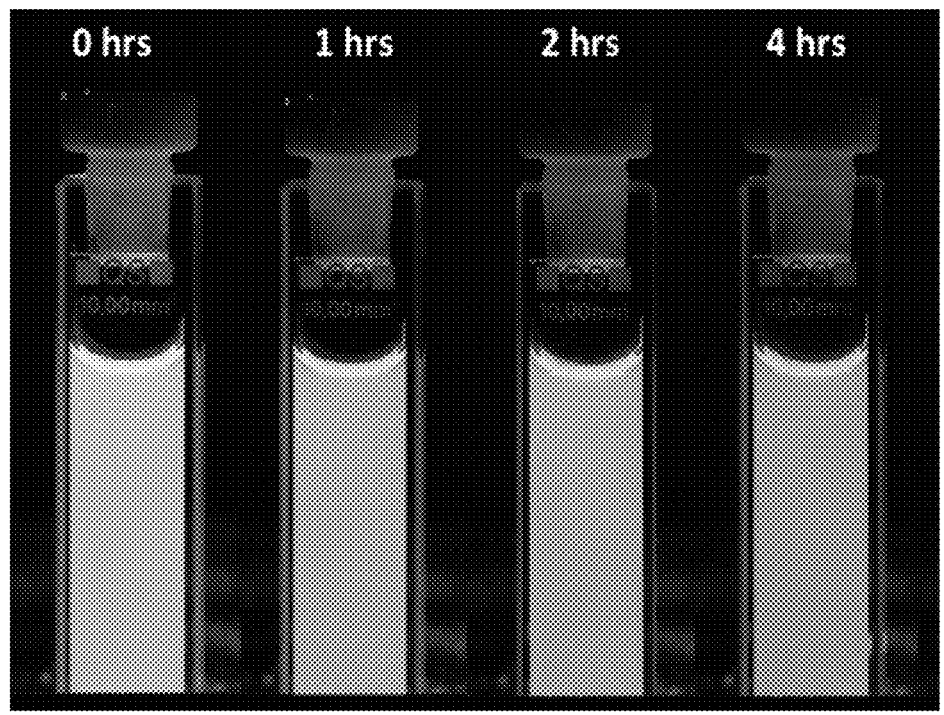
FIG. 9A shows samples of PEI-PMAA nanoparticles in water under UV irradiation at different exposure times.
Figure 9B:
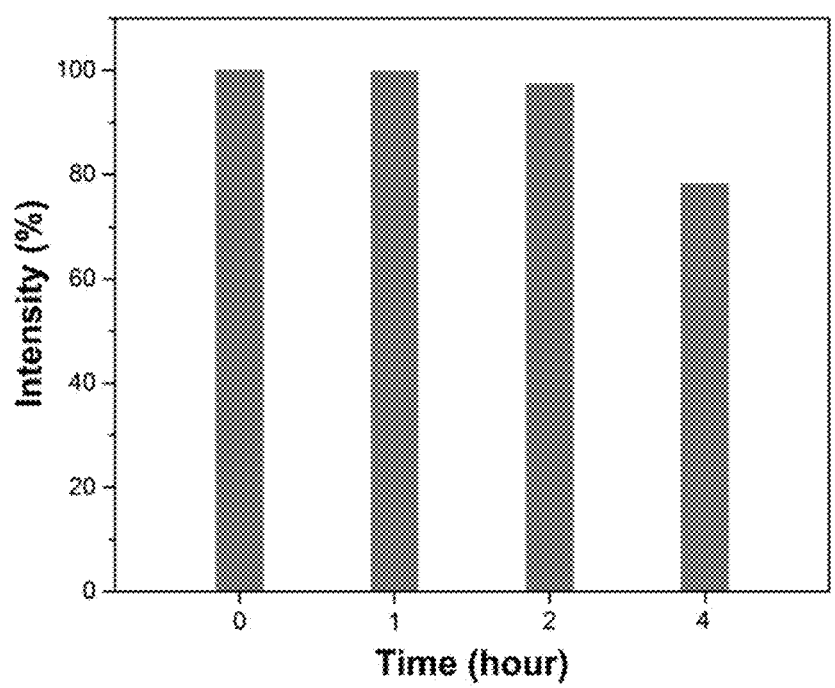
FIG. 9B shows the photoluminescence intensity of PEI-PMAA of FIG. 9A as a function of the UV irradiation time.

Photostability of PEI-PMAA nanoparticle was evaluated by continuously irradiating the particle dispersion under 365 nm UV lamp (6 Watt) for up to 4 hours (FIG. 9A). FIG. 9B shows that the sample still possessed 78% photoluminescence intensity even after 4 hours UV radiation. The result is superior to other fluorescent materials such as CDs, CdTe QDs, dye-doped $SiO_2$ nanoparticles, dye-doped polymer nanoparticles and fluorescein isothiocyanate (FITC) [30]. Thus, the PEI-PMAA nanoparticle exhibits remarkable photo stability.

(iv) Phosphorescence in Solid State at Room Temperature

Figure 10:
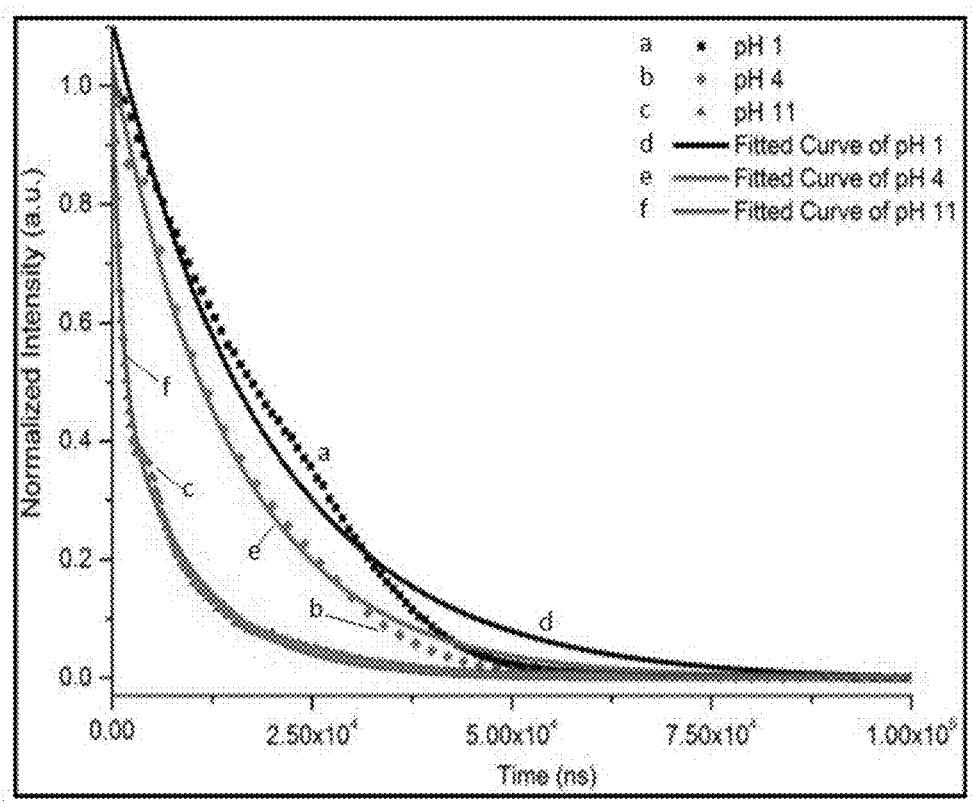
FIG. 10 shows the phosphorescence lifetime of PEI-PMAA nanoparticles in solid state at pH 1, 4, and 11.
Figure 11A:
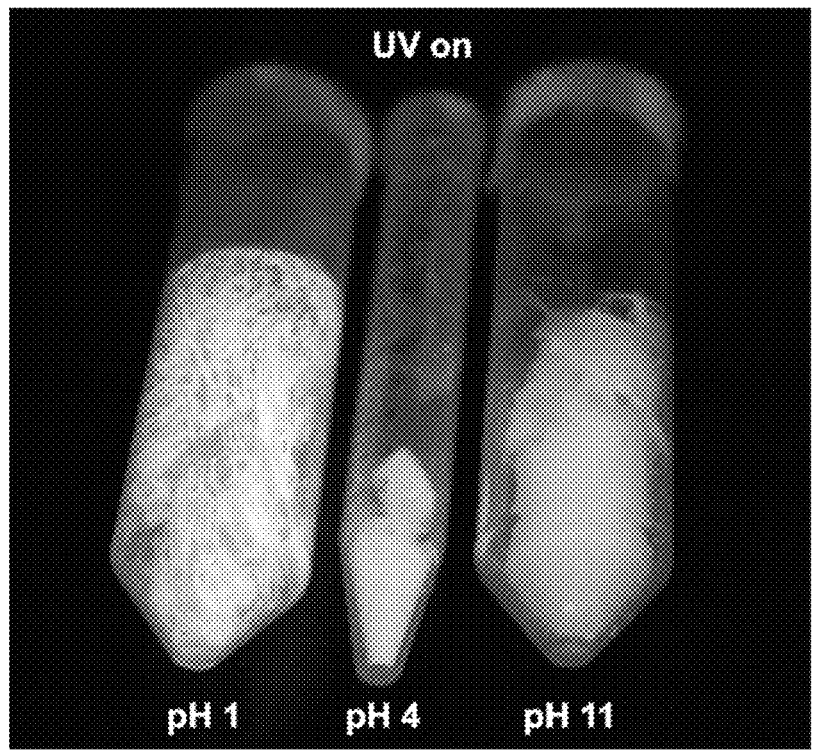
FIG. 11A shows solid samples of PEI-PMAA nanoparticles observed under a handheld UV lamp (365 nm).
Figure 11B:
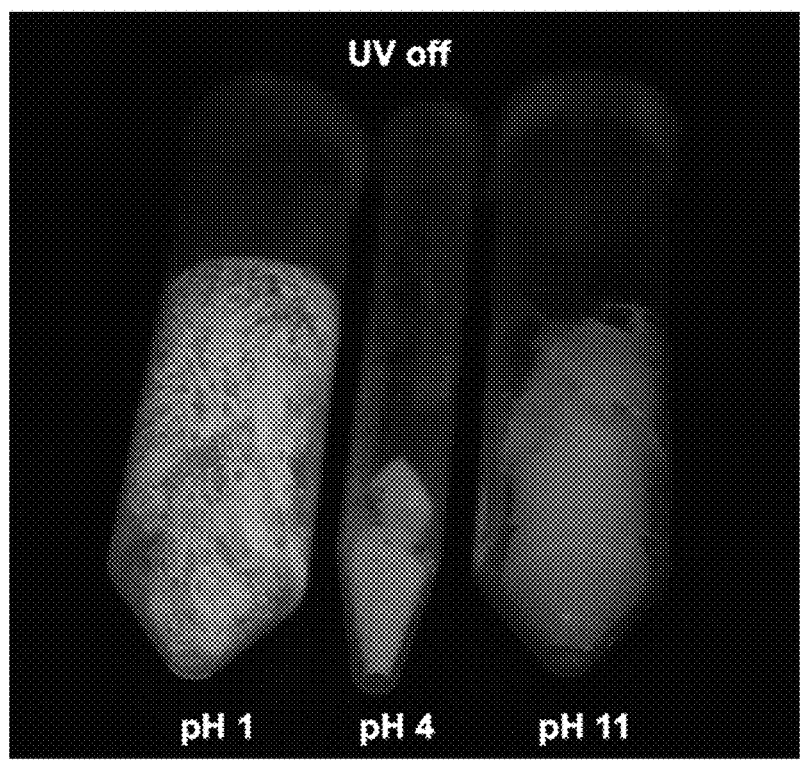
FIG. 11B shows solid samples of PEI-PMAA nanoparticles after switching off the UV light source at room temperature.
Figure 12A:
FIG. 12A shows samples of PEI-PMAA nanoparticles suspended in both DMSO and deionized (DI) water under a handheld UV lamp at room temperature.
Figure 12B:
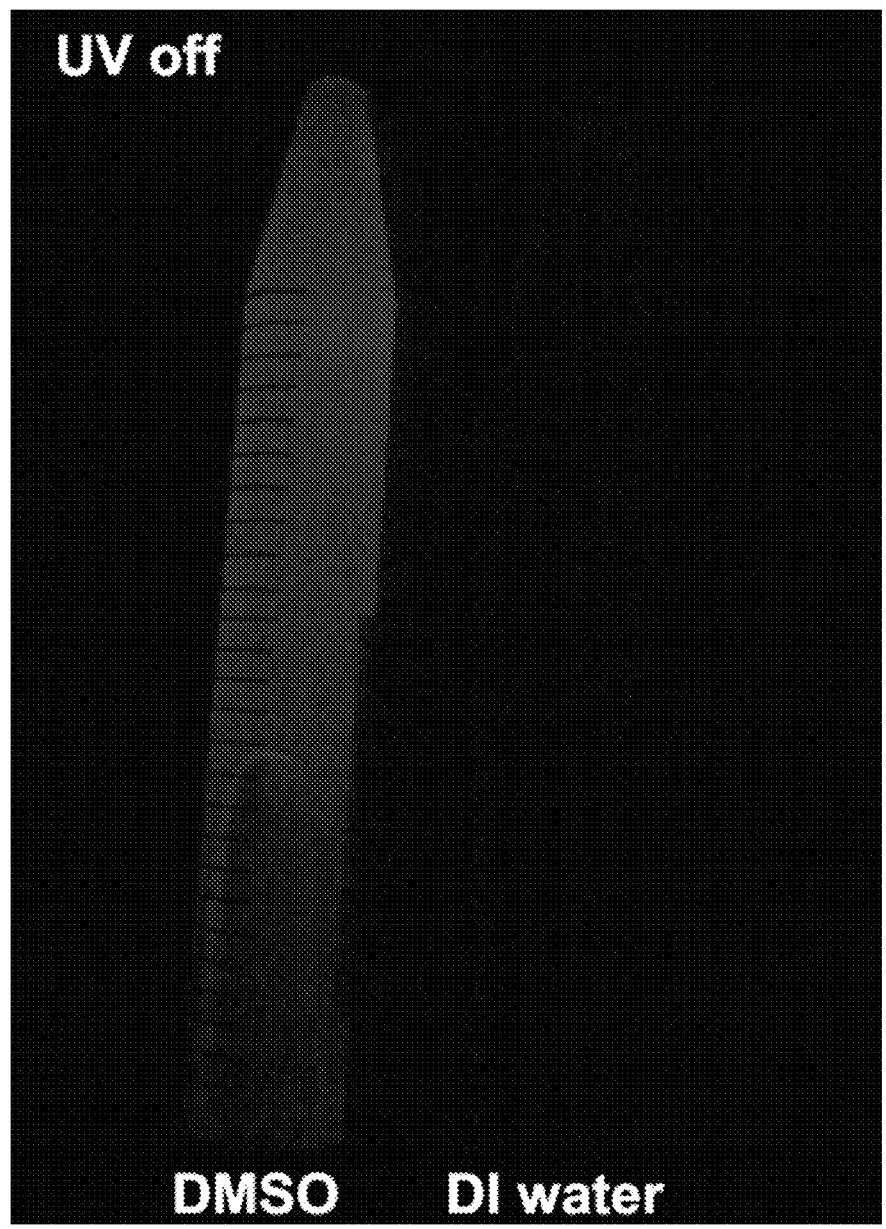
FIG. 12B shows samples of PEI-PMAA nanoparticles suspended in both DMSO and DI water immediately after switching off the UV light source at room temperature.

The traditional dye molecules are often quenched in aggregated solid state. Since the triplet state of the organic molecules are always not efficient, only a small portion of the organic molecules could emit phosphorescence in solid state. For example, molecules which are able to form H-aggregate through π-π stacking interaction of the conjugated phenyl rings could stabilize the triplet excitons at room temperature in solid state, thus resulting in the phosphorescence emission. However, the nonconjugated PEI-PMAA nanoparticles of the present invention is also found to possess ultrabright phosphorescence and long phosphorescence lifetime in solid state at room temperature. FIG. 10 shows the phosphorescent lifetime of the PEI-PMAA nanoparticles in solid state at different pH values. It was found that the longest lifetime of the solid PEI-PMAA nanoparticle is 21.2 μs. Furthermore, the phosphorescence of PEI-PMAA nanoparticles could be directly observed through the naked eye (FIG. 11). Under the UV irradiation, the solid PEI-PMAA nanoparticles emit bright white fluorescence (FIG. 11A). After switching off the UV light source, the PEI-PMAA nanoparticle emitted bright yellow phosphorescence (FIG. 11B). Furthermore, when dispersing the freeze-dried PEI-PMAA nanoparticles in organic solvents [for example, dimethylsulfoxide (DMSO)] and irradiating with UV light, the nanoparticle dispersion would still emit bright yellow phosphorescence after UV light source was switched off (FIG. 12). However, when the particles were dispersed in the deionized water, there was not phosphorescence after turning off the excitation (FIG. 12b). These results indicate the solvent-dependent phosphorescence behavior of the PEI-PMAA nanoparticles.

4) Application of the PEI-PMAA Nanoparticles

The poly(amine-acid) nonconjugated photoluminescent polymer nanoparticles of the present invention are expected to find valuable applications in many areas.

(i) Chemosensing

Figure 13A:
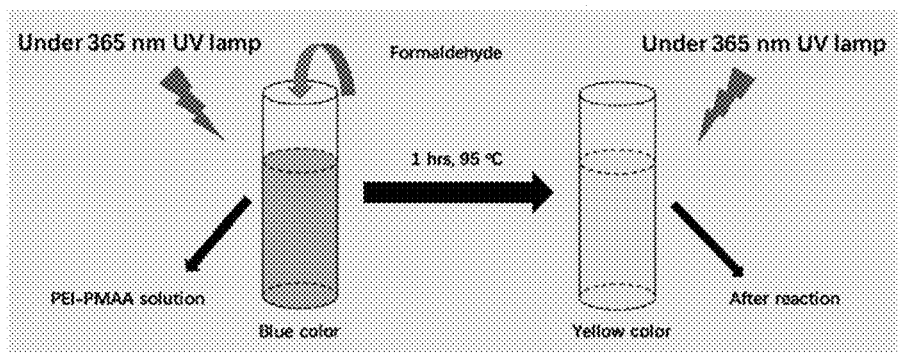
FIG. 13A shows a reaction scheme of using PEI-PMAA nanoparticles for formaldehyde (FA) detection.
Figure 13B:
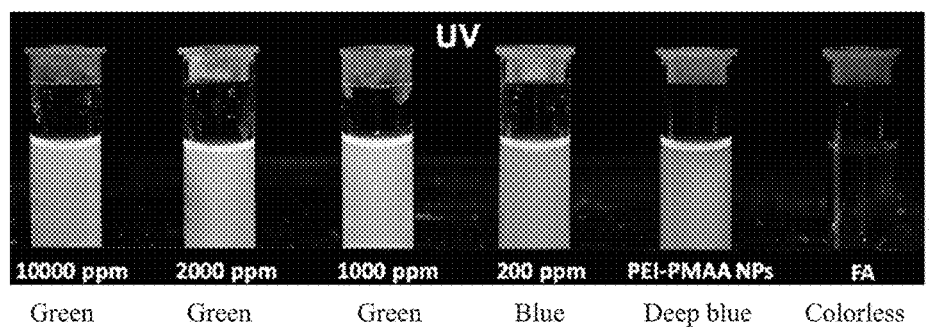
FIG. 13B shows solutions after reacting with different concentrations (ppm) of formaldehyde at 95° C. for 1 hour, and irradiated with UV lamp (365 nm).
Figure 14A:
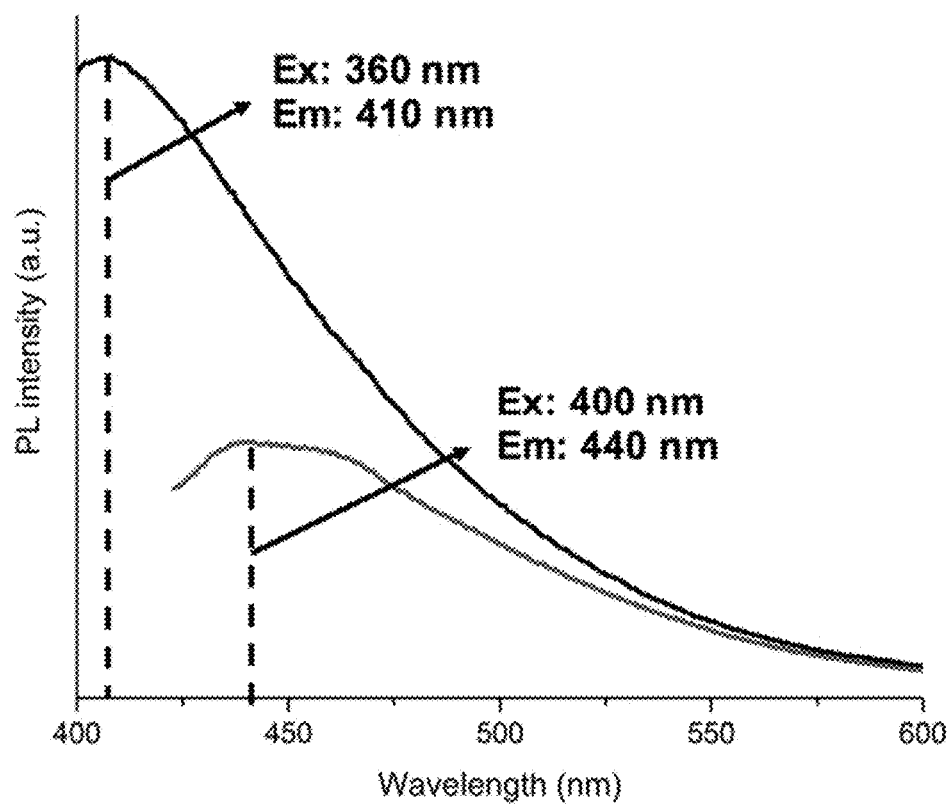
FIG. 14A shows a photoluminescence spectra of a PEI-PMAA stock solution (0.6 mg/mL) when excited with 360 nm and 400 nm laser.
Figure 14B:
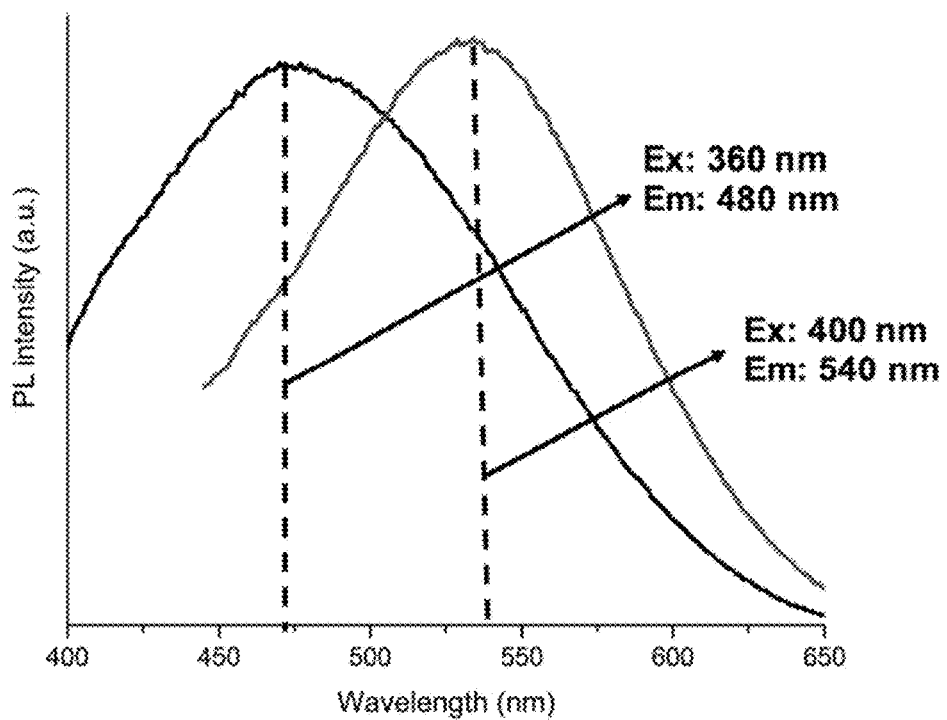
FIG. 14B shows a photoluminescence spectra of a PEI-PMAA solution after reacting with 2000 ppm of formaldehyde (FA), when excited with 360 nm and 400 nm laser.

Since the Poly(amine-acid) nanoparticles possesses numerous amino groups which are the chromophore to the emission of the light, the PEI-PMAA nanoparticles can be used for the detection the formaldehyde (FA) in aqueous solution using Schiff-base reaction between amines in the PEI-PMAA nanoparticles and aldehyde group in formaldehyde in solution (FIG. 13A). FIG. 13B shows the color change of the PEI-PMAA nanoparticle solution (0.6 mg/mL) after reacting with different concentrations of FA [(0 ppm as control), 200, 1000, 2000 and 10000 ppm] at 95° C. for 1 hour. It was found that the emission color of the resultant solution was red-shifted when increasing FA concentration. The photoluminescence spectra of both PEI-PMAA stock solution (0.6 mg/mL) (FIG. 14A) and the after-FA-reaction PEI-PMAA nanoparticle (reacted with 2000 ppm FA) (FIG. 14B) were compared. From the photoluminescence spectra, when using 360 nm excitation, the emission of the reacted PEI-PMAA nanoparticle has red-shifted to 480 nm. Furthermore, when using 400 nm excitation, the emission of reacted PEI-PMAA nanoparticles also red-shifted to 540 nm. These results suggest that this kind of poly(amine-acid) nanoparticle can be used for detection of all kinds of aldehydes through Schiff base reaction.

Furthermore, the poly(amine-acid) nanoparticles could be used in heavy metal detection. Since heavy metal ions always have unoccupied orbitals, they can easily coordinate with the lone pair electrons on amines in an amine-containing polymer, whereby quenching any fluorescence. Besides, the nanoparticles possess carboxyl groups on the particle surface, which could easily complex with positively charged metal ions in water through electrostatic interaction and coordination. Therefore, the nanoparticles can function as heavy metal ion detection agent and remover at the same time.

(ii) Fluorescent and Phosphorescent Coating Materials

The poly(amine-acid) nanoparticles has been successfully applied as fluorescent coating materials for various substrate surfaces. For example, PEI-PMAA nanoparticles have been coated on wood specimen, giving wood product with photoluminescence property. The preliminary results suggest that the PEI-PMAA nanoparticles have good compatibility with wood surface due to their hydrophilic nature. Thus, these kinds of photoluminescence nanoparticles can be used as fluorescent and phosphorescent coating materials for leather finishing, paints, paper, textile industrials, fashion design industrials and even building materials.

(iii) Photoluminescent Nanofiller for Polymer and Composite Materials

Figure 15A:
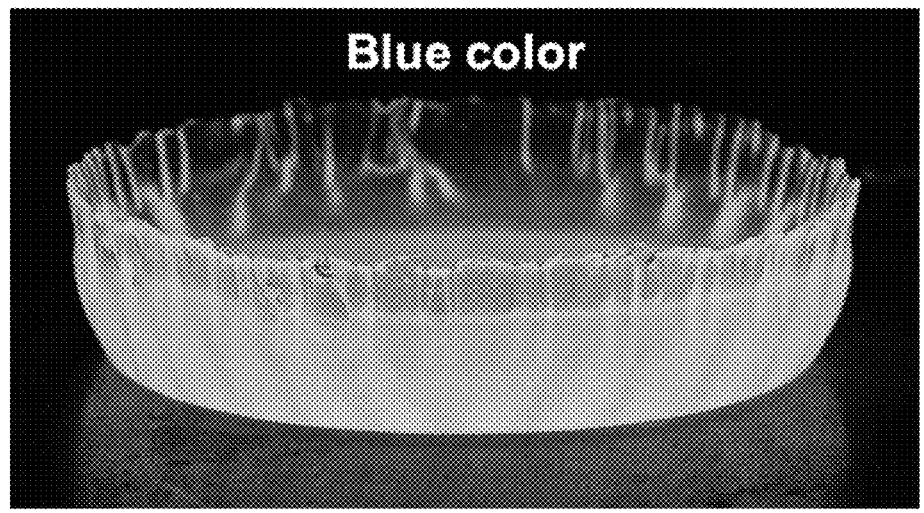
FIGS. 15A-15C show the same sample specimen prepared from mixing a solid PEI-PMAA nanoparticle with oligomer of methyl methacrylate, followed by further polymerization under free-radical polymerization. The images were taken under a handheld UV lamp at 365 nm (FIG. 15A), a portable UV lamp at 400 nm (FIG. 15B), and no UV light (FIG. 15C).
Figure 15B:
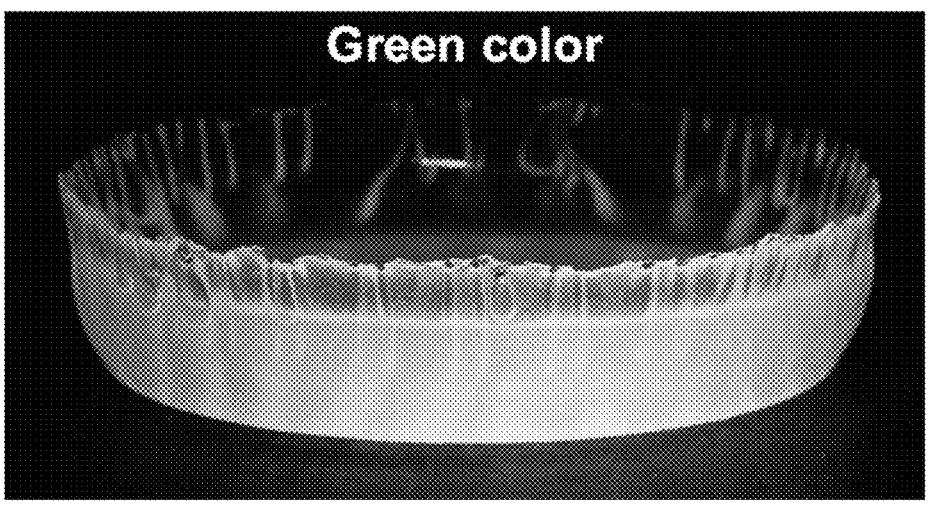
Figure 15C:
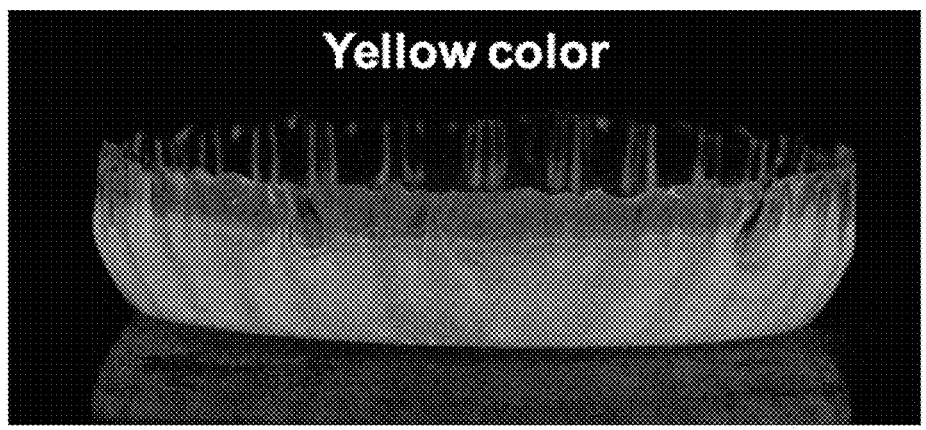

The poly(amine-acid) nanoparticles exhibit ultrabright fluorescence and phosphorescence in solid state. The nanoparticles in powder form can be used as photoluminescent (PL) nanofiller in polymers. For example, FIG. 15 shows pictures of PMMA samples containing poly(amine-acid) nanoparticles irradiated under different UV wavelengths. The specimen emits bright blue and green colors under 365 and 400 nm UV irradiations, respectively (FIGS. 15A and 15B). When turning off the UV light, the specimen can emit bright yellow phosphorescence (FIG. 15C). These results indicate that the poly(amine-acid) nanoparticles could be used as photoluminescent nanofiller in polymer and composites.

The poly(amine-acid) nanoparticles can also be used as light-scattering filler to simultaneously enhance the haze and transmittance of transparent polymers for LED lighting and displays.

(iv) Organic Photovoltaics

The poly(amine-acid) nanoparticles possess long phosphorescent lifetime and ultrabright phosphorescence in solid state, which is highly desirable properties for fabrication of organic photovoltaics (OPV) as electron transporting layer. Since the fluorescent emission is guided by singlet state, which process only ¼ energy, while the rest ¾ is processed by the triplet state-phosphorescent emission, the poly (amine-acid) nanoparticle is an ideal material for electron transportation layer in OPV because it possesses both fluorescent and phosphorescent emission at room temperature. In addition, the longer exciton lifetime in phosphorescent materials can facilitate the excitons to travel much longer distance, thus extending the exciton diffusion length and increase the power-conversion efficiency of OPV. Furthermore, the highly conjugated small molecules or semiconducting polymers are always used as electron transporting layer materials in traditional OPV. However, the film formation is often a problem, thus lowering the performance of OPV and limiting the large-scale production of the OPV. Since the poly(amine-acid) nanoparticles is an excellent coating material, it may overcome the film formation problem in traditional OPV fabrication process, and applicable for large-scale production [31, 32].

(v) Fluorescent and Phosphorescent Inks

Since the poly(amine-acid) nanoparticles have excellent water dispersibility, they could be utilized as water-based fluorescent or phosphorescent ink in anti-counterfeit applications.

(vi) Other Applications

The poly(amine-acid) nanoparticles may find potential applications in areas such as: (a) Biological imaging probe (in vitro and in vivo); (b) as nanocarrier for imaging guided gene/drug delivery; (c) Organic light-emitting diode (OLED); (d) Photopatterning; and (e) Functional bioelectronics.

REFERENCES

1. Shyamal, M., et al., *Pyrene Scaffold as Real-Time Fluorescent Turn-on Chemosensor for Selective Detection of Trace-Level Al(III) and Its Aggregation-Induced Emission Enhancement*. The Journal of Physical Chemistry A, 2016. 120(2): p. 210-220.
2. Shi, B., et al., *Nitrogen-rich functional groups carbon nanoparticles based fluorescent pH sensor with broad-range responding for environmental and live cells applications*. Biosensors and Bioelectronics, 2016. 82: p. 233-239.
3. Takashima, I., et al., *Development of an AND Logic-Gate-Type Fluorescent Probe for Ratiometric Imaging of Autolysosome in Cell Autophagy*. Chemistry—A European Journal, 2015. 21(5): p. 2038-2044.
4. Chang, S., et al., *A pH-responsive hybrid fluorescent nanoprober for real time cell labeling and endocytosis tracking*. Biomaterials, 2013. 34(38): p. 10182-10190.
5. Chang, S., et al., *A Hydrophobic Dye-Encapsulated Nano-Hybrid as an Efficient Fluorescent Probe for Living Cell Imaging*. Advanced Healthcare Materials, 2012. 1(4): p. 475-479.
6. Peng, H.-S. and D. T. Chiu, *Soft fluorescent nanomaterials for biological and biomedical imaging*. Chemical Society Reviews, 2015. 44(14): p. 4699-4722.
7. Baldo, M. A., et al., *Highly efficient phosphorescent emission from organic electroluminescent devices*. Nature, 1998. 395(6698): p. 151-154.
8. Dias, F. B., et al., *Triplet Harvesting with 100% Efficiency by Way of Thermally Activated Delayed Fluorescence in Charge Transfer OLED Emitters*. Advanced Materials, 2013. 25(27): p. 3707-3714.
9. Zhou, G., et al., *Triphenylamine-Dendronized Pure Red Iridium Phosphors with Superior OLED Efficiency/Color Purity Trade-Offs*. Angewandte Chemie International Edition, 2007. 46(7): p. 1149-1151.
10. O'Regan, B. and M. Gratzel, *A low-cost, high-efficiency solar cell based on dye-sensitized colloidal TiO2 films*. Nature, 1991. 353(6346): p. 737-740.
11. Wang, P., et al., *A stable quasi-solid-state dye-sensitized solar cell with an amphiphilic ruthenium sensitizer and polymer gel electrolyte*. Nat Mater, 2003. 2(6): p. 402-407.
12. Law, M., et al., *Nanowire dye-sensitized solar cells*. Nat Mater, 2005. 4(6): p. 455-459.
13. You, J., et al., *A polymer tandem solar cell with 10.6% power conversion efficiency*. Nat Commun, 2013. 4: p. 1446.
14. Yang, Y., et al., *High-performance multiple-donor bulk heterojunction solar cells*. Nat Photon, 2015. 9(3): p. 190-198.
15. Michalet, X., et al., *Quantum Dots for Live Cells, in Vivo Imaging, and Diagnostics*. Science, 2005. 307(5709): p. 538-544.

16. Deng, R., et al., *Temporal full-colour tuning through non-steady-state upconversion*. Nat Nano, 2015. 10(3): p. 237-242.

17. Zhou, B., et al., *Controlling upconversion nanocrystals for emerging applications*. Nat Nano, 2015. 10(11): p. 924-936.

18. Wu, C. and D. T. Chiu, *Highly Fluorescent Semiconducting Polymer Dots for Biology and Medicine*. Angewandte Chemie International Edition, 2013. 52(11): p. 3086-3109.

19. Chen, S., et al., *Fabrication of fluorescent nanoparticles based on AIE luminogens (AIE dots) and their applications in bioimaging*. Materials Horizons, 2016. 3(4): p. 283-293.

20. Zhu, S., et al., *The photoluminescence mechanism in carbon dots (graphene quantum dots, carbon nanodots, and polymer dots): current state and future perspective*. Nano Research, 2015. 8(2): p. 355-381.

21. Kozák, O., et al., *Photoluminescent Carbon Nanostructures*. Chemistry of Materials, 2016. 28(12): p. 4085-4128.

22. Zhao, E., et al., *Poly[(maleic anhydride)-alt-(vinyl acetate)]: A Pure Oxygenic Nonconjugated Macromolecule with Strong Light Emission and Solvatochromic Effect*. Macromolecules, 2015. 48(1): p. 64-71.

23. Zhou, Q., et al., *Clustering-Triggered Emission of Nonconjugated Polyacrylonitrile*. Small, 2016: p. n/a-n/a.

24. Pastor-Peréz, L., et al., *Unprecedented Blue Intrinsic Photoluminescence from Hyperbranched and Linear Polyethylenimines: Polymer Architectures and pH-Effects*. Macromolecular Rapid Communications, 2007. 28(13): p. 1404-1409.

25. Zhu, S., et al., *The crosslink enhanced emission (CEE) in non-conjugated polymer dots: from the photoluminescence mechanism to the cellular uptake mechanism and internalization*. Chemical Communications, 2014. 50(89): p. 13845-13848.

26. Sun, B., et al., *Fluorescent non-conjugated polymer dots for targeted cell imaging*. Nanoscale, 2016. 8(18): p. 9837-9841.

27. Sun, Y., et al., *Ultrabright and Multicolorful Fluorescence of Amphiphilic Polyethyleneimine Polymer Dots for Efficiently Combined Imaging and Therapy*. Scientific Reports, 2013. 3: p. 3036.

28. Liu, S. G., et al., *Water-Soluble Nonconjugated Polymer Nanoparticles with Strong Fluorescence Emission for Selective and Sensitive Detection of Nitro-Explosive Picric Acid in Aqueous Medium*. ACS Applied Materials & Interfaces, 2016. 8(33): p. 21700-21709.

29. Liu, S. G., et al., *Polyethylenimine-Derived Fluorescent Nonconjugated Polymer Dots with Reversible Dual-Signal pH Response and Logic Gate Operation*. The Journal of Physical Chemistry C, 2017. 121(12): p. 6874-6883.

30. Hola, K., et al., *Carbon dots—Emerging light emitters for bioimaging, cancer therapy and optoelectronics*. Nano Today, 2014. 9(5): p. 590-603.

31. Cheng, Y.-J., S.-H. Yang, and C.-S. Hsu, *Synthesis of Conjugated Polymers for Organic Solar Cell Applications*. Chemical Reviews, 2009. 109(11): p. 5868-5923.

32. Huang, X., et al., *Enhancing solar cell efficiency: the search for luminescent materials as spectral converters*. Chemical Society Reviews, 2013. 42(1): p. 173-201.

What is claimed is:

1. A photoluminescent nanoparticle obtained by a method comprising the following steps:
(a) mixing an amine-containing polymer with a monomer of an α,β-unsaturated carboxylic acid or α,β-unsaturated carboxylic acid anhydride, wherein said amine-containing polymer and said monomer undergo Michael addition reaction and amidation reaction to form a prepolymer, wherein said monomer has a formula of $CH_2=CR_1R_2$, wherein $R_1$ is hydrogen, alkyl having 1-10 carbon atoms, or phenyl, and $R_2$ is —COOH or —COOCOR$_3$ wherein $R_3$ is alkyl, phenyl, benzyl, or heteroaryl;
(b) adding a radical initiator to the reaction mixture containing said prepolymer and said monomer from step (a) to form a poly(amine-acid) polymer; and
(c) allowing said poly(amine-acid) polymer to self-assemble via electrostatic interaction between carboxyl group and amine group to form said nanoparticle.

2. The nanoparticle of claim 1, wherein said amine-containing polymer is synthetic or natural polymer.

3. The nanoparticle of claim 1, wherein said amine-containing polymer is water soluble.

4. The nanoparticle of claim 1, wherein said amine-containing polymer is selected from the group consisting of polyethyleneimine (PEI), linear Polyethylenimine, poly(allylamine), poly (acrylamide), poly[dimethylsiloxane-co-(3-aminopropyl)methylsiloxane], poly(vinylamine), poly(N-methylvinylamine), chitosan, polylysine, casein, gelatin, bovine serum albumin and protein.

5. The nanoparticle of claim 1, wherein said amine-containing polymer is polyethyleneimine.

6. The nanoparticle of claim 1, wherein said monomer is methacrylic acid.

7. The nanoparticle of claim 1, wherein the nanoparticle has hydrodynamic diameter ($D_h$) value ranging from 30 nm to 500 nm.

8. The nanoparticle of claim 1, wherein the nanoparticle has a polydispersity index (PDI) value ranging from 0.05 to 0.2 in water.

9. The nanoparticle of claim 1, wherein the nanoparticle has surface charges ranging from 20 mV to 55 mV.

10. The nanoparticle of claim 1, wherein the nanoparticle has IR absorption bands at 3500-2800 $cm^{-1}$, 1750-1600 $cm^{-1}$, 1560-1540 $cm^{-1}$, 1480-1450 $cm^{-1}$, 1410-1390 $cm^{-1}$ and 1200-1100 $cm^{-1}$.

11. The nanoparticle of claim 1, having a carbon to nitrogen average ratio in the range of 2:1 to 45:1 per dry weight.

12. The nanoparticle of claim 1, wherein 0.1-1.0 mg/ml of said nanoparticle in water has photoluminescence peak ranging from 400 nm to 420 nm under excitation wavelength of 360 nm, or 3-7.5 mg/ml of said nanoparticle in water has photoluminescence peak ranging from 450 nm to 480 nm under excitation wavelength of 420 nm, or 8-20 mg/ml of said nanoparticle in water has photoluminescence peak ranging from 470 nm to 550 nm under excitation wavelength of 420 nm.

13. The nanoparticle of claim 1, having an absolute quantum yield up to 85%.

14. The nanoparticle of claim 1, having a fluorescence lifetime ranging from 0.3-10 ns.

15. The nanoparticle of claim 1, having a phosphorescence lifetime ranging from 1-1000 μs.

16. A method for preparing a photoluminescent nanoparticle, comprising the steps of:
(a) reacting an amine-containing polymer and a monomer of an α,β-unsaturated carboxylic acid or α,β-unsaturated carboxylic acid anhydride to form a prepolymer via Michael addition and amidation; and (b) adding a radical initiator to the reaction mixture containing prepolymer and monomer from step (a) to form a poly(amine-acid) polymer; and (c) allowing said poly(amine-acid) polymer to self-assemble via electrostatic interaction between carboxyl group and amine group to form said nanoparticle.

17. The method of claim 16, wherein the weight ratio of said monomer to said amine-containing polymer ranges from 1:10 to 10:1.

18. The method of claim 16, wherein said method is performed in a solvent selected from the group consisting of water, HCl, $H_2SO_4$, $HNO_3$, acetic acid, trifluoroacetic acid and any mixture thereof.

19. The method of claim 16, wherein said radical initiator is selected from the group consisting of hydroperoxide, potassium persulfate, 2,2'-azobis(2-amidinopropane) hydrochloride, and water-soluble azo initiators.

* * * * *